United States Patent
Fan et al.

(10) Patent No.: US 11,090,624 B2
(45) Date of Patent: Aug. 17, 2021

(54) REACTOR SYSTEM WITH UNEQUAL REACTOR ASSEMBLY OPERATING PRESSURES

(71) Applicant: OHIO STATE INNOVATION FOUNDATION, Columbus, OH (US)

(72) Inventors: Liang-Shih Fan, Upper Arlington, OH (US); Dawei Wang, Upper Arlington, OH (US); Mandar Kathe, Columbus, OH (US)

(73) Assignee: OHIO STATE INNOVATION FOUNDATION, Columbus, OH (US)

( * ) Notice: Subject to any disclaimer, the term of this patent is extended or adjusted under 35 U.S.C. 154(b) by 0 days.

(21) Appl. No.: 16/634,844

(22) PCT Filed: Jul. 31, 2018

(86) PCT No.: PCT/US2018/044530
§ 371 (c)(1),
(2) Date: Jan. 28, 2020

(87) PCT Pub. No.: WO2019/027972
PCT Pub. Date: Feb. 7, 2019

(65) Prior Publication Data
US 2020/0156032 A1    May 21, 2020

Related U.S. Application Data

(60) Provisional application No. 62/589,144, filed on Nov. 21, 2017, provisional application No. 62/565,565, (Continued)

(51) Int. Cl.
*B01J 8/12* (2006.01)
*B01J 8/00* (2006.01)
(Continued)

(52) U.S. Cl.
CPC .......... *B01J 8/0035* (2013.01); *B01D 53/047* (2013.01); *B01J 8/003* (2013.01); *B01J 8/005* (2013.01);
(Continued)

(58) Field of Classification Search
CPC ........................................................ B01J 8/003
See application file for complete search history.

(56) References Cited

U.S. PATENT DOCUMENTS

| 971,206 A | 9/1910 | Messerschmitt |
| 1,078,686 A | 11/1913 | Lane |

(Continued)

FOREIGN PATENT DOCUMENTS

| CN | 1329761 A | 1/2001 |
| CN | 1325319 A | 12/2001 |

(Continued)

OTHER PUBLICATIONS

Abad et al., "Chemical-looping combustion in a 300 W continuously operating reactor system using a manganese-based oxygen carrier," Fuel, 2006, vol. 85, Issue 9, pp. 1174-1185.
(Continued)

*Primary Examiner* — Stuart L Hendrickson
(74) *Attorney, Agent, or Firm* — Michael Best & Friedrich LLP

(57) ABSTRACT

A reactor system comprising a first reactor assembly, a first pressure transition assembly, a second reactor assembly and a second pressure transition assembly.

17 Claims, 11 Drawing Sheets

Related U.S. Application Data filed on Sep. 29, 2017, provisional application No. 62/539,374, filed on Jul. 31, 2017.

(51) Int. Cl.

| | | |
|---|---|---|
| *B01D 53/047* | (2006.01) | |
| *B01J 8/04* | (2006.01) | |
| *B01J 8/08* | (2006.01) | |
| *B01J 8/18* | (2006.01) | |
| *B01J 8/26* | (2006.01) | |
| *C01B 3/34* | (2006.01) | |
| *C01B 3/48* | (2006.01) | |
| *C01B 3/56* | (2006.01) | |

(52) U.S. Cl.
CPC .............. *B01J 8/0492* (2013.01); *B01J 8/085* (2013.01); *B01J 8/1827* (2013.01); *B01J 8/1872* (2013.01); *B01J 8/26* (2013.01); *C01B 3/344* (2013.01); *C01B 3/48* (2013.01); *C01B 3/56* (2013.01); *B01D 2253/102* (2013.01); *B01D 2253/104* (2013.01); *B01D 2253/108* (2013.01); *B01D 2253/116* (2013.01); *B01D 2256/10* (2013.01); *B01D 2256/16* (2013.01); *B01D 2257/104* (2013.01); *B01D 2257/304* (2013.01); *B01D 2257/502* (2013.01); *B01D 2257/504* (2013.01); *B01J 2208/00778* (2013.01); *C01B 2203/0255* (2013.01); *C01B 2203/0283* (2013.01); *C01B 2203/042* (2013.01); *C01B 2203/047* (2013.01); *C01B 2203/0475* (2013.01)

(56) References Cited

U.S. PATENT DOCUMENTS

| | | |
|---|---|---|
| 1,658,939 A | 2/1928 | Parsons |
| 2,182,747 A | 12/1939 | Marshall, Jr. |
| 2,198,560 A | 4/1940 | Marshall, Jr. |
| 2,449,635 A | 9/1948 | Barr |
| 2,614,067 A | 10/1952 | Reed et al. |
| 2,635,947 A | 4/1953 | Reed et al. |
| 2,686,819 A | 8/1954 | Johnson |
| 2,694,622 A | 11/1954 | Reed et al. |
| 2,697,686 A | 12/1954 | Leffer |
| 2,899,374 A | 8/1959 | Gomory |
| 2,979,384 A | 4/1961 | Weiner et al. |
| 3,027,238 A | 3/1962 | Watkins |
| 3,031,287 A | 4/1962 | Benson et al. |
| 3,338,667 A | 8/1967 | Pundsack |
| 3,353,925 A | 11/1967 | Baumann et al. |
| 3,382,033 A | 5/1968 | Kitagawa |
| 3,421,869 A | 1/1969 | Benson |
| 3,442,613 A | 5/1969 | Grotz, Jr. |
| 3,442,619 A | 5/1969 | Huebler et al. |
| 3,442,620 A | 5/1969 | Huebler et al. |
| 3,494,858 A | 2/1970 | Luckenbach |
| 3,523,821 A | 8/1970 | Bryce et al. |
| 3,573,224 A | 3/1971 | Strelzoff et al. |
| 3,619,142 A | 11/1971 | Johnson et al. |
| 3,726,966 A | 4/1973 | Johnston |
| 3,801,661 A | 4/1974 | Hart et al. |
| 3,879,514 A | 4/1975 | Dahl |
| 3,962,409 A | 6/1976 | Kotera et al. |
| 4,017,270 A | 4/1977 | Funk et al. |
| 4,057,402 A | 11/1977 | Patel et al. |
| 4,075,079 A | 2/1978 | Lang |
| 4,108,732 A | 8/1978 | Nuttall, Jr. |
| 4,151,124 A | 4/1979 | Gidaspow et al. |
| 4,155,832 A | 5/1979 | Cox et al. |
| 4,272,399 A | 6/1981 | Davis et al. |
| 4,318,711 A | 3/1982 | Smith |
| 4,325,833 A | 4/1982 | Scott |
| 4,334,959 A | 6/1982 | Green |
| 4,343,624 A | 8/1982 | Belke et al. |
| 4,348,487 A | 9/1982 | Goldstein et al. |
| 4,404,086 A | 9/1983 | Oltrogge |
| 4,420,332 A | 12/1983 | Mori et al. |
| 4,439,412 A | 3/1984 | Behie et al. |
| 4,521,117 A | 6/1985 | Ouwerkerk et al. |
| 4,594,140 A | 6/1986 | Cheng |
| 4,778,585 A | 10/1988 | Graff |
| 4,842,777 A | 6/1989 | Lamort |
| 4,861,165 A | 8/1989 | Fredriksson et al. |
| 4,869,207 A | 9/1989 | Engstrom et al. |
| 4,902,586 A | 2/1990 | Wertheim |
| 4,895,821 A | 6/1990 | Kainer et al. |
| 4,957,523 A * | 9/1990 | Zarate ................ B01D 53/0473 62/646 |
| 5,130,106 A | 7/1992 | Koves et al. |
| 5,365,560 A | 11/1994 | Tam |
| 5,447,024 A | 9/1995 | Ishida et al. |
| 5,456,807 A | 10/1995 | Wachsman |
| 5,509,362 A | 4/1996 | Lyon |
| 5,518,187 A | 5/1996 | Bruno et al. |
| 5,529,599 A | 6/1996 | Calderon |
| 5,584,615 A | 12/1996 | Micklich |
| 5,630,368 A | 5/1997 | Wagoner |
| 5,730,763 A | 3/1998 | Manulescu et al. |
| 5,770,310 A | 6/1998 | Nogochi et al. |
| 5,827,496 A | 10/1998 | Lyon |
| 5,858,210 A | 1/1999 | Richardson |
| 5,965,098 A | 10/1999 | Boegner et al. |
| 6,007,699 A | 12/1999 | Cole |
| 6,030,589 A | 2/2000 | Hartweg et al. |
| 6,143,203 A | 11/2000 | Zeng et al. |
| 6,143,253 A | 11/2000 | Radcliffe et al. |
| 6,180,354 B1 | 1/2001 | Singh et al. |
| 6,187,465 B1 | 2/2001 | Galloway |
| 6,361,757 B1 | 3/2002 | Shikada et al. |
| 6,395,944 B1 | 5/2002 | Griffiths |
| 6,412,559 B1 | 7/2002 | Gunter et al. |
| 6,444,712 B1 | 9/2002 | Janda |
| 6,494,153 B1 | 12/2002 | Lyon |
| 6,506,351 B1 | 1/2003 | Jain et al. |
| 6,509,000 B1 | 1/2003 | Choudhary et al. |
| 6,517,631 B1 | 2/2003 | Bland |
| 6,607,704 B2 | 8/2003 | Guttridge et al. |
| 6,631,698 B1 | 10/2003 | Hyppanen et al. |
| 6,642,174 B2 | 11/2003 | Gaffney et al. |
| 6,663,681 B2 | 12/2003 | Kinding et al. |
| 6,667,022 B2 | 12/2003 | Cole |
| 6,669,917 B2 | 12/2003 | Lyon |
| 6,682,714 B2 | 1/2004 | Kindig et al. |
| 6,685,754 B2 | 2/2004 | Kindig et al. |
| 6,703,343 B2 | 3/2004 | Park |
| 6,797,253 B2 | 9/2004 | Lyon |
| 6,834,623 B2 | 12/2004 | Cheng |
| 6,875,411 B2 | 4/2005 | Sanfilippo et al. |
| 6,880,635 B2 | 4/2005 | Vinegar et al. |
| 6,936,363 B2 | 8/2005 | Kordesch et al. |
| 7,001,579 B2 | 2/2006 | Metzger et al. |
| 7,067,456 B2 | 2/2006 | Fan et al. |
| 7,244,399 B2 | 7/2007 | Myohanen et al. |
| 7,404,942 B2 | 7/2008 | Sanfilippo et al. |
| 7,496,450 B2 | 2/2009 | Ortiz Aleman et al. |
| 7,749,626 B2 | 7/2010 | Take |
| 7,767,191 B2 | 8/2010 | Thomas et al. |
| 7,837,975 B2 | 11/2010 | Iyer et al. |
| 7,840,053 B2 | 11/2010 | Liao |
| 8,116,430 B1 | 2/2012 | Shapiro et al. |
| 8,192,706 B2 | 6/2012 | Grochowski |
| 8,202,349 B2 | 6/2012 | Molaison |
| 8,419,813 B2 | 4/2013 | Hoteit et al. |
| 8,435,920 B2 | 5/2013 | White et al. |
| 8,508,238 B2 | 8/2013 | Mahalingam et al. |
| 8,562,928 B2 | 10/2013 | Gupta |
| 8,761,943 B2 | 6/2014 | Lou et al. |
| 8,771,549 B2 | 7/2014 | Gauthier et al. |
| 8,814,963 B2 | 8/2014 | Apanel et al. |
| 8,877,147 B2 | 11/2014 | Fan et al. |
| 8,877,150 B1 | 11/2014 | Fan et al. |
| 9,017,627 B2 | 4/2015 | Gupta |

(56) References Cited

U.S. PATENT DOCUMENTS

| | | |
|---|---|---|
| 9,290,386 B2 | 3/2016 | Wasas |
| 9,382,359 B2 | 7/2016 | Kanellopoulos et al. |
| 9,573,118 B2 | 2/2017 | Colozzi et al. |
| 10,010,847 B2* | 7/2018 | Fan ............... B01J 8/26 |
| 10,081,772 B2* | 9/2018 | Fan ............... B01J 21/063 |
| 2001/0055559 A1 | 12/2001 | Sanfilippo et al. |
| 2002/0011428 A1 | 1/2002 | Scheuerman |
| 2002/0059864 A1 | 5/2002 | Janssen et al. |
| 2002/0179887 A1 | 12/2002 | Zeng et al. |
| 2003/0006026 A1 | 1/2003 | Matsumoto et al. |
| 2003/0024388 A1 | 2/2003 | Scharpf |
| 2003/0031291 A1 | 2/2003 | Yamamoto et al. |
| 2003/0119658 A1 | 6/2003 | Allison et al. |
| 2003/0124041 A1 | 7/2003 | Neumann et al. |
| 2003/0130360 A1 | 7/2003 | Kindig et al. |
| 2003/0153632 A1 | 8/2003 | Wang et al. |
| 2003/0180215 A1 | 9/2003 | Niu et al. |
| 2003/0188668 A1 | 10/2003 | Bland |
| 2004/0028181 A1 | 2/2004 | Charles, Jr. et al. |
| 2004/0030214 A1 | 2/2004 | Schindler et al. |
| 2004/0092784 A1 | 5/2004 | Legendre |
| 2004/0109800 A1 | 6/2004 | Pahlman et al. |
| 2004/0126293 A1 | 7/2004 | Geerlings et al. |
| 2004/0131531 A1 | 7/2004 | Geerlings et al. |
| 2004/0132833 A1 | 7/2004 | Espinoza et al. |
| 2004/0138060 A1 | 7/2004 | Rapier et al. |
| 2004/0152790 A1 | 8/2004 | Cornaro et al. |
| 2004/0154223 A1 | 8/2004 | Powell et al. |
| 2004/0197612 A1 | 10/2004 | Keefer et al. |
| 2004/0213705 A1 | 10/2004 | Blencoe et al. |
| 2004/0233191 A1 | 11/2004 | Mukherjee et al. |
| 2004/0244289 A1 | 12/2004 | Morozumi et al. |
| 2004/0265224 A1 | 12/2004 | Papavassiliou et al. |
| 2005/0002847 A1 | 1/2005 | Maroto-Valer et al. |
| 2005/0054880 A1 | 3/2005 | Dubois et al. |
| 2005/0175533 A1 | 8/2005 | Thomas et al. |
| 2005/0255037 A1 | 11/2005 | Otsuka et al. |
| 2005/0265912 A1 | 12/2005 | Alvarez, Jr. et al. |
| 2005/0274648 A1 | 12/2005 | Goldstein et al. |
| 2006/0021308 A1 | 2/2006 | Merkel |
| 2006/0042565 A1 | 3/2006 | Hu |
| 2006/0094593 A1 | 5/2006 | Beech, Jr. et al. |
| 2007/0010588 A1 | 1/2007 | Pearson |
| 2007/0049489 A1 | 3/2007 | Becue et al. |
| 2007/0117714 A1 | 5/2007 | Geyer et al. |
| 2007/0157517 A1 | 7/2007 | Tsay et al. |
| 2007/0258878 A1 | 11/2007 | Sanfilippo et al. |
| 2008/0031809 A1 | 2/2008 | Norbeck et al. |
| 2008/0161624 A1 | 7/2008 | Glover et al. |
| 2008/0164443 A1 | 7/2008 | White et al. |
| 2008/0209807 A1 | 9/2008 | Tsangaris et al. |
| 2008/0314838 A1 | 12/2008 | Becker et al. |
| 2009/0000194 A1 | 1/2009 | Fan et al. |
| 2009/0042070 A1 | 2/2009 | Brown et al. |
| 2009/0160461 A1 | 6/2009 | Zangl et al. |
| 2010/0071262 A1 | 3/2010 | Robinson et al. |
| 2010/0119419 A1 | 5/2010 | Sprouse et al. |
| 2010/0184589 A1 | 7/2010 | Miyairi et al. |
| 2010/0187159 A1 | 7/2010 | Naunheimer |
| 2010/0258429 A1 | 10/2010 | Ugolin |
| 2010/0293845 A1 | 11/2010 | Zeman et al. |
| 2010/0332170 A1 | 12/2010 | Gao et al. |
| 2011/0005395 A1 | 1/2011 | Vimalchand et al. |
| 2011/0011720 A1 | 1/2011 | Rinker |
| 2011/0024687 A1 | 2/2011 | White et al. |
| 2011/0054049 A1 | 3/2011 | Lambert et al. |
| 2011/0094226 A1 | 4/2011 | McHugh et al. |
| 2011/0100274 A1 | 5/2011 | Kuske et al. |
| 2011/0138788 A1 | 6/2011 | Kanda et al. |
| 2011/0146152 A1 | 6/2011 | Vimalchand et al. |
| 2011/0176968 A1 | 7/2011 | Fan et al. |
| 2011/0176988 A1 | 7/2011 | Okamura et al. |
| 2011/0206469 A1 | 8/2011 | Furuyama et al. |
| 2011/0289845 A1 | 12/2011 | Davis et al. |
| 2011/0291051 A1 | 12/2011 | Hershkowitz et al. |
| 2011/0300060 A1 | 12/2011 | Guillou et al. |
| 2011/0303875 A1 | 12/2011 | Hoteit et al. |
| 2012/0167585 A1 | 7/2012 | Wormser |
| 2012/0171588 A1 | 7/2012 | Fan et al. |
| 2012/0214106 A1 | 8/2012 | Sit et al. |
| 2013/0071314 A1 | 3/2013 | Gupta |
| 2013/0085365 A1 | 4/2013 | Marashdeh et al. |
| 2013/0149650 A1 | 6/2013 | Gauthier et al. |
| 2013/0255272 A1 | 10/2013 | Ajhar et al. |
| 2013/0261355 A1 | 10/2013 | Stamires |
| 2014/0021028 A1 | 1/2014 | Paganessi et al. |
| 2014/0034134 A1 | 2/2014 | Fan et al. |
| 2014/0144082 A1 | 5/2014 | Fan et al. |
| 2014/0275297 A1 | 9/2014 | Velazquez-Vargas et al. |
| 2015/0238915 A1 | 8/2015 | Fan et al. |
| 2015/0343416 A1 | 12/2015 | Fadhel et al. |
| 2016/0002034 A1 | 1/2016 | Fan et al. |
| 2016/0016800 A1 | 1/2016 | Noyes |
| 2016/0023190 A1 | 1/2016 | Fan et al. |
| 2016/0030904 A1 | 2/2016 | Fan et al. |
| 2016/0268616 A1 | 9/2016 | Fan et al. |
| 2016/0376512 A1 | 12/2016 | Fan et al. |
| 2018/0296978 A1 | 10/2018 | Peck et al. |
| 2018/0353933 A1 | 12/2018 | Wendland et al. |
| 2019/0003704 A1 | 1/2019 | Aranda et al. |

FOREIGN PATENT DOCUMENTS

| | | |
|---|---|---|
| CN | 1454711 A | 11/2003 |
| CN | 1501534 A | 6/2004 |
| CN | 101389734 A | 3/2009 |
| CN | 101426885 A | 5/2009 |
| CN | 102187153 A | 9/2011 |
| CN | 102388005 A | 3/2012 |
| CN | 102612625 A | 7/2012 |
| CN | 102639213 A | 8/2012 |
| CN | 102686301 A | 9/2012 |
| CN | 103468322 A | 12/2013 |
| DE | 102010028816 A1 | 11/2011 |
| EP | 0161970 A1 | 11/1985 |
| EP | 1134187 A2 | 9/2001 |
| EP | 1445018 A1 | 8/2004 |
| EP | 1580162 A2 | 9/2005 |
| EP | 1845579 A2 | 10/2007 |
| EP | 1933087 A2 | 6/2008 |
| EP | 2279785 A2 | 2/2011 |
| EP | 2441816 A1 | 4/2012 |
| EP | 2450420 A1 | 5/2012 |
| EP | 2495030 A2 | 9/2012 |
| EP | 2515038 A1 | 10/2012 |
| EP | 2601443 A0 | 6/2013 |
| EP | 1976633 B1 | 3/2014 |
| FR | 2924035 A1 | 5/2009 |
| JP | H03-68898 A | 3/1991 |
| JP | H10249153 A | 9/1998 |
| JP | 2006-502957 A | 1/2006 |
| KR | 20060096609 A | 9/2006 |
| KR | 101364823 B1 | 2/2014 |
| TW | 406055 B | 9/2000 |
| TW | 426728 B | 3/2001 |
| WO | WO1990/013773 A1 | 11/1990 |
| WO | WO1999/065097 A1 | 12/1999 |
| WO | WO2000/022690 A1 | 4/2000 |
| WO | WO2000/068339 A1 | 11/2000 |
| WO | WO2001/042132 A1 | 6/2001 |
| WO | WO2003/070629 A1 | 8/2003 |
| WO | WO2007/082089 A2 | 7/2007 |
| WO | WO2007/122498 A2 | 11/2007 |
| WO | WO2007/134075 A2 | 11/2007 |
| WO | WO2008/019079 A2 | 2/2008 |
| WO | WO2008/071215 A1 | 6/2008 |
| WO | WO2008/082312 A1 | 7/2008 |
| WO | WO2008/115076 A2 | 9/2008 |
| WO | 2009/008565 A1 | 1/2009 |
| WO | WO2009/007200 A2 | 1/2009 |
| WO | WO2009/009388 A2 | 1/2009 |
| WO | 2009/023515 A2 | 2/2009 |
| WO | WO2009/021258 A1 | 2/2009 |
| WO | WO2009/114309 A2 | 9/2009 |

(56) References Cited

FOREIGN PATENT DOCUMENTS

| WO | WO2010/037011 A2 | 4/2010 |
|---|---|---|
| WO | WO2010/063923 A2 | 6/2010 |
| WO | WO2010/126617 A1 | 11/2010 |
| WO | WO2011/021161 A2 | 2/2011 |
| WO | WO2011/031752 A2 | 3/2011 |
| WO | WO2011/031755 A1 | 3/2011 |
| WO | WO2011/084734 A2 | 7/2011 |
| WO | WO2012/064712 A1 | 5/2012 |
| WO | WO2012/077978 A2 | 6/2012 |
| WO | WO2012/155054 A1 | 11/2012 |
| WO | WO2012/155059 A1 | 11/2012 |
| WO | WO2013/040645 A1 | 3/2013 |
| WO | WO2014/085243 A1 | 6/2014 |
| WO | WO2011/153568 A1 | 12/2014 |
| WO | WO2014/195904 A1 | 12/2014 |
| WO | WO2016/053941 A1 | 4/2016 |
| WO | 2017/162427 A1 | 9/2017 |

OTHER PUBLICATIONS

Abad et al., "Reduction Kinetics of CU-, Ni-, and Fe-Based Oxygen Carriers Using Syngas (CO + H2) for Chemical-Looping Combustion," Energy Fuels, 2007, 21 (4), pp. 1843-1853.

Abad et al., "The use of iron oxide as oxygen carrier in a chemical-looping reactor," Fuel, 2007, vol. 86, Issues 7-8, pp. 1021-1035.

Abdallah et al., "Comparison of mesoporous silicate supports for the immobilisation and activity of cytochrome c and lipase," J. Mol. Catal. B: Enzym., 2014, 108, 82-88.

Adanez et al., "Progress in Chemical-Looping Combustion and Reforming technologies," Progress in Energy and Combustion Science, 2012, vol. 38, Issue 2, pp. 215-282.

Adanez et al., "Selection of oxygen carriers for chemical-looping combustion," Energy & Fuels, American Chemical Society, 2004, vol. 18, No. 2, pp. 371-377.

Ahern et al., "Comparison of fenofibratemesoporous silica drug-loading processes for enhanced drug delivery," Eur. J. Pharm. Sci., 2013, 50, 400-409.

Alalwan et al., "Co3O4 nanoparticles as oxygen carriers for chemical looping combustion: A materials characterization approach to understanding oxygen carrier performance," Chemical Engineering Journal, 2017, 319, 279-287.

Alalwan et al., "α-Fe2O3 Nanoparticles as Oxygen Carriers for Chemical Looping Combustion: An Integrated Materials Characterization Approach to Understanding Oxygen Carrier Performance, Reduction Mechanism, and Particle Size Effects," Energy Fuels, 2018, 32, 7959-7970.

Anisimov et al., "Density-functional calculation of effective Coulomb interactions in metals," Phys. Rev. B, 1991, 43, 7570.

Azis et al., "On the evaluation of synthetic and natural ilmenite using syngas as fuel in chemical-looping combustion (CLC)," Chemical Engineering Research and Design, 2010, vol. 88, Issue 11, pp. 1505-1514.

Balasubramanian et al., "Hydrogen from methane in a single-step process," Chem Engr Science, 1999, 54(15-16), 3543.

Barreca et al., "Methanolysis of styrene oxide catalysed by a highly efficient zirconium-doped mesoporous silica," Appl. Catal. A, 2006, 304, 14-20.

Bell et al., "H2 Production via Ammonia Decomposition Using Non-Noble Metal Catalysts: A Review," Top Catal, 2016, 59, 1438-1457.

Burke et al., "Large pore bi-functionalised mesoporous silica for metal ion pollution treatment," J. Hazard. Mater., 2009, 164, 229-234.

Cao et al., "Investigation of Chemical Looping Combustion by Solid Fuels. 1. Process Analysis," Energy Fuels, 2006, 20(5), pp. 1836-1844.

Carrero et al., "A critical literature review of the kinetics for the oxidative dehydrogenation of propane over well-defined supported vanadium oxide catalysts," ACS Catalysis, 2014, 4: 3357-3380.

Cavani et al., "Oxidative dehydrogenation of ethane and propane: How far from commercial implementation?" Catalysis Today, 2007, 127(1): 113-131.

Cheng et al., "Carbon Dioxide Adsorption and Activation on Ceria (110): A density functional theory study," J. Chem. Phys. 2013, 138, 014702.

Cheng et al., "Methane Adsorption and Dissociation on Iron Oxide Oxygen Carrier: Role of Oxygen Vacancy," Phys. Chem. Chem. Phys. 2016, 18, 16423-16435.

Cheng et al., "Oxygen vacancy promoted methane partial oxidation over iron oxide oxygen carrier in chemical looping process," Phys. Chem. Chem. Phys., 2016, 18, 32418-32428.

Cheng et al., "Propagation of Olefin Metathesis to Propene on WO3 Catalysts: A Mechanistic and Kinetic Study," ACS Catal. 2015, 5, 59-72.

Cho et al., "Comparison of iron-, nickel-, copper- and manganese-based oxygen carriers for chemical-looping combustion," Fuel, 2004, vol. 83, Issue 9, pp. 1215-1225.

Chung et al., "Chemically and physically robust, commercially-viable iron-based composite oxygen carriers sustainable over 3000 redox cycles at high temperatures for chemical looping applications," Energy Environ. Sci., 2017, 10, 2318-2323.

Coleman et al., "Synthesis and characterization of dimensionally ordered semiconductor nanowires within mesoporous silica," J. Am. Chem. Soc., 2001, 123, 7010-7016.

Connell et al., "Process Simulation of Iron-Based Chemical Looping Schemes with CO2 Capture for Hydrogen and Electricity Production from Coal," Presented at 29th Annual International Pittsburgh Coal Conference, Pittsburgh, PA, Oct. 15-18, 2012, pp. 1274-1281.

De Diego et al., "Development of Cu-based oxygen carriers for chemical-looping combustion," Fuel, 2004, vol. 83, Issue 13, pp. 1749-1757.

De Klerk, "Gas-to-Liquid Conversion." Natural Gas Conversion Technologies Workshop of ARPA-E. U.S. Department of Energy, Houston, TX. vol. 13 (2012).

Delaney et al., "Development of chemically engineered porous metal oxides for phosphate removal," J. Hazard. Mater., 2011, 185, 382-391.

Delaney et al., "Porous silica spheres as indoor air pollutant scavengers," J. Environ. Monit., 2010, 12, 2244-2251.

Denton et al., "Simultaneous Production of High-Purity Hydrogen and Sequestration-Ready CO2 from Syngas," 2003.

EIA—Independent Statistics and Analysis. U.S. Department of Energy, U.S. Energy Information Administration "Annual Energy Outlook 2015 with Projections to 2040," Apr. 2015.

EIA—Independent Statistics and Analysis. U.S. Department of Energy, U.S. Energy Information Administration, "How Much Petroleum Does the United States Import and from Where?" <https://www.eia.gov/tools/faqs/faq.php?id=727&t=6> webpage available as early as Mar. 22, 2017.

EIA—Independent Statistics and Analysis. U.S. Department of Energy, U.S. Energy Information Administration, "Natural Gas Vented and Flared." <https://www.eia.gov/dnav/ng/NG_PROD_SUM_A_EPG0_VGV_MMCF_A.htm> webpage available as early as Feb. 29, 2016.

EIA—Independent Statistics and Analysis. U.S. Department of Energy, U.S. Energy Information Administration, "Natural Gas Weekly Update." <https://www.eia.gov/naturalgas/weekly/> webpage available as early as Dec. 4, 2011.

Environmental Protection Agency, "Geological CO2 Sequestration Technology and Cost Analysis," Technical Support Document, pp. i-vi & pp. 1-61, Jun. 2008.

Fan et al., "Chemical looping processes for CO2 capture and carbonaceous fuel conversion prospect and opportunity," Energy Environmental Science, 2012, p. 7254-7280.

Fan et al., "Utilization of chemical looping strategy in coal gasification processes," Particuology, 2008, vol. 6, Issue 3, pp. 131-142.

Fan et al., "Chemical-Looping Technology Platform," AIChE Journal, 61(1), 2-22 (2015).

Fan, "Chemical Looping Systems for Fossil Energy Conversions," Wiley-AIChE: Hoboken, NJ, U.S.A.; 2010.

(56) References Cited

OTHER PUBLICATIONS

Flynn et al., "Pervaporation performance enhancement through the incorporation of mesoporous silica spheres into PVA membranes," Sep. Purif. Technol., 2013, 118, 73-80.

Forero et al., "Syngas combustion in a 500 Wth Chemical-Looping Combustion system using an impregnated Cu-based oxygen carrier," Fuel Processing Technology, 2009, vol. 90, Issue 12, pp. 1471-1479.

Forzatti, "Present status and perspectives in de-NOx SCR catalysis." Appl. Catal. A: Gen., 222(1-2), 2001, 221-236.

Gao et al., "Production of syngas via autothermal reforming of methane in a fluidized-bed reactor over the combined $CeO_2$-$ZrO_2$/$SiO_2$ supported Ni catalysts," International Journal of Hydrogen Energy, 2008, vol. 33, p. 5493-5500.

Garcia-Labiano et al., "Temperature variations in the oxygen carrier particles during their reduction and oxidation in a chemical-looping combustion system," Chemical Engineering Science, 2005, vol. 60, No. 3, pp. 851-862.

Geldart, "Types of Gas Fluidization," Power Technology, vol. 7, pp. 285-292, 1973.

Ghanapragasam et al., "Hydrogen production from coal direct chemical looping and syngas chemical looping combustion systems: Assessment of system operation and resource requirements," International Journal of Hydrogen Energy, 2009, vol. 34, Issue 6, pp. 2606-2615.

Ghoneim et al., "Review on innovative catalytic reforming of natural gas to syngas," World J. Eng. Technol, 2016, 4(1):116-139.

Go et al., "Hydrogen production from two-step steam methane reforming in a fluidized bed reactor," International Journal of Hydrogen Energy, 2009, vol. 34, p. 1301-1309.

Goellner, J. F., V. Shah, M. J. Turner, N. J. Kuehn, J. Littlefield, G. Cooney, and J. Marriott, "Analysis of Natural Gas-to Liquid Transportation Fuels via Fischer-Tropsch," United States Department of Energy/NETL, DOE/NETL-2013/1597, Pittsburgh, PA (2013).

Grimme et al., "A consistent and accurate ab initio parametrization of density functional dispersion correction (DFT-D) for the 94 elements H-Pu," J. Chem. Phys., 2010, 132, 19.

Grimme et al., "Effect of the damping function in dispersion corrected density functional theory," J. Comput. Chem., 2011, 32, 1456-1465.

Haque, "Microwave energy for mineral treatment processes—a brief review," International Journal of Mineral Processing, vol. 57, pp. 1-24, 1999.

Henkelman et al., "A climbing image nudged elastic band method for finding saddle points and minimum energy paths," J. Chem. Phys., 2000, 113, 9901-9904.

Herbst et al., "Relativistic calculations of 4f excitation energies in the rare-earth metals: Further results," Phys. Rev. B, 1978, 17, 3089.

Herzog, "Carbon Sequestration via Mineral Carbonation: Overview and Assessment," MIT Laboratory for Energy and the Environmental, http://sequestration.mit.edu/pfd/carbonates.pdf, Mar. 14, 2002.

Hildebrandt et al., "Producing Transportation Fuels with Less Work," Science, Mar. 27, 2009, vol. 323, pp. 1680-1681.

Hossain et al., "Chemical-looping combustion (CLC) for inherent CO2 separations—a review," Chemical Engineering Science, 2008, vol. 63, Issue 18, pp. 4433-4451.

Hua et al., "Three Dimensional Analysis of Electrical Capacitance Tomography Sensing Fields," 1999 IOP Publishing LTD, vol. 10, pp. 717-725.

Huijgen et al., "Carbon dioxide sequestration by mineral carbonation," ECN-C--03-016, www.ecn.nl/docs/library/report/200e/c03016.pdf, Feb. 2003.

Hung et al., "Zeolite ZSM-5 Supported Bimetallic Fe-Based Catalysts for Selective Catalytic Reduction of NO: Effects of Acidity and Metal Loading," Advanced Porous Materials, 2016, 4(3): 189-199(11).

Imanaka et al., "Advances in Direct NOx Decomposition Catalysts," Appl. Catal. A: Gen., 431-432, 2012, 1-8.

Ishida et al., "Evaluation of a Chemical-Looping-Combustion Power-Generation System by Graphic Exergy Analysis," Energy, 12(2), 147-154 (1987).

Iwamoto et al., "Influence of sulfur dioxide on catalytic removal of nitric oxide over copper ion-exchanged ZSM-5 Zeolite." Appl. Catal., 69(2), 1991, 15-19.

Izquierdo et al., "Catalyst Deactivation and Regeneration Processes in Biogas Tri-Reforming Process. The Effect of Hydrogen Sulfide Addition," Catalysts, 2018, 8(12): 19 pages.

Jadhav et al., "Carbonation of Mg-Bearing Minerals: Kinetic and Mechanistic Studies," Ohio Coal Research Consortium/Ohio State University Project C3.12, www.ohiocoal.org/projects/year3/c3.12, Jul. 3, 2002.

Jin et al., "Development of a Novel Chemical-Looping Combustion: Synthesis of a Looping Material with a Double Metal Oxide of Co0-NiO," Energy & Fuels, 1998, vol. 12, 1272-1277.

Johansson et al., "Combustion of Syngas and Natural Gas in a 300 W Chemical-Looping Combustor," Chemical Engineering Research and Design Volume, 2006, vol. 84, Issue 9, pp. 819-827.

Kaiser et al., "Precombustion and Postcombustion Decarbonization," IEEE, Power Engineering Review, Apr. 2001, pp. 15-17.

Kathe et al., "Chemical Looping Gasification for Hydrogen Enhanced Syngas Production with in-situ CO2 Capture," United States Department of Energy, OSTI: 1185194, (2015).

Kiuchi et al., "Recovery of hydrogen from hydrogen sulfide with metals or metal sulfides," Int. J. Hydrogen Energy, 1982, 7: 477-482.

Koulialias et al., "Ordered defects in Fe 1—x S generate additional magnetic anisotropy symmetries," Journal of Applied Physics, 2018, 123(3): 033902, 10 pages.

Kresse et al., "Ab initio molecular dynamics for liquid metals," Phys. Rev. B, 1993, 47, 558.

Kresse et al., "Efficiency of ab-initio total energy calculations for metals and semiconductors using a plane-wave basis set," Comput. Mater. Sci., 1996, 6, 15-50.

Kresse et al., "Efficient iterative schemes for ab initio total-energy calculations using a plane-wave basis set," Phys. Rev. B, 1996, 54, 11169.

Kumar et al., "Direct air capture of CO2 by physisorbent materials," Angew. Chem., Int. Ed., 2015, 54, 14372-14377.

Leion et al., "Solid fuels in chemical-looping combustion using oxide scale and unprocessed iron ore as oxygen carriers," Fuel, 2009, vol. 88, Issue 10, pp. 1945-1954.

Leion et al., "Solid fuels in chemical-looping combustion," International Journal of Greenhouse Gas Control, 2008, vol. 2, Issue 2, pp. 180-193.

Leion et al., "The use of petroleum coke as fuel in chemical-looping combustion," Fuel, 2007, vol. 86, Issue 12-13, pp. 1947-1958.

Li et al., "Clean coal conversion processes—progress and challenges," The Royal Society of Chemistry, Energy & Environmental Science, Jul. 30, 2008, vol. 1, pp. 248-267.

Li et al., "Ionic Diffusion in the Oxidation of Iron-effect of Support and Its Implications to Chemical Looping Applications," Energy Environ. Sci. 2011, 4, 876-880.

Li et al., "Role of Metal Oxide Support in Redox Reactions of Iron Oxide for Chemical Looping Applications: Experiments and Density Functional Theory Calculations," Energy Environmental Science, 2011, vol. 4, p. 3661-3667.

Li et al., "Syngas chemical looping gasification process: Bench-scale studies and reactor simulations," AICHE Journal, 2010, vol. 56, Issue 8, pp. 2186-2199.

Li et al., "Syngas Chemical Looping Gasification Process: Oxygen Carrier Particle Selection and Performance," Energy Fuels, 2009, 23(8), pp. 4182-4189.

Liu et al., "Enhanced Performance of Alkali Metal Doped Fe2O3 and Fe2O3/Al2O3 Composites as Oxygen Carrier Material in Chemical Looping Combustion," Energy Fuels. 2013, 27, 4977-4983.

Liu et al., "Recent Advances in Catalytic DeNOx Science and Technology," Catalysis Reviews, 48(1), 2006, 43-89.

(56) References Cited

OTHER PUBLICATIONS

Luo et al., "Shale Gas-to-Syngas Chemical Looping Process for Stable Shale Gas Conversion to High Purity Syngas with H2:CO Ratio of 2:1," Energy and Environmental Science, 7(12), 4104-4117, (2014).
Lyngfelt, "Chemical Looping Combustion of Solid Fuels—Status of Development," Applied Energy, 2014, vol. 113, p. 1869-1873.
Lyngfelt, "Oxygen Carriers for Chemical Looping Combustion Operational Experience," 1st International Conference on Chemical Looping, Mar. 2010.
Makepeace et. al., "Ammonia decomposition catalysis using non-stoichiometric lithium imide," Chem. Sci., 2015, 6, 3805.
Mamman et al., "Simultaneous steam and CO2 reforming of methane to syngas over NiO/MgO/SA-5205 in presence and absence of oxygen," Applied Catalysis A, 1998, vol. 168, p. 33-46.
Mao et al., "Facile synthesis of phase-pure $FeCr_2Se_4$ and $FeCr_2S_4$ nanocrystals via a wet chemistry method," J. Mater. Chem. C, 2014, 2: 3744-3749.
Marashdeh, Q. et al., "A Multimodal Tomography System Based on ECT Sensors," IEEE Sensors Journal, vol. 7, No. 3, 2007, 426-433.
Marashdeh, Q., Advances in Electrical Capacitance Tomography, Dissertation, The Ohio State University, 2006.
Masui et al.,"Direct Decomposition of NO into N2 and O2 Over C-type Cubic Y2O3—Tb4O7—ZrO2," Materials Sciences and Applications, 3(10), 2012, 733-738.
Mattisson et al., "Application of chemical-looping combustion with capture of CO2," Second Nordic Minisymposium on Carbon Dioxide Capture and Storage, Goeteborg, Oct. 26, 2001, pp. 46-51.
Mattisson et al., "Chemical-looping combustion using syngas as fuel," International Journal of Greenhouse Gas control, 2007, vol. 1, Issue 2, pp. 158-169.
Mattisson et al., "CO 2 capture from coal combustion using chemical-looping combustion—Reactivity investigation of Fe, Ni and Mn based oxygen carriers using syngas," Department of Energy and Environment, Division of Energy Technology and Department of Chemical and Biological Engineering, Division of Environmental Inorganic Chemistry, Chalmers University of Technology, 2007.
Mattisson et al., "Reactivity of Some Metal Oxides Supported on Alumina with Alternating Methane and Oxygen—Application for Chemical-Looping Combustion," Energy & Fuels, 2003, vol. 17, pp. 643-651.
Mattisson et al., "The use of iron oxide as an oxygen carrier in chemical-looping combustion of methane with inherent separation of CO2," Fuel, 2001, vol. 80, pp. 1953-1962.
Mattisson et al., "Use of Ores and Industrial Products As Oxygen Carriers in Chemical-Looping Combustion," Energy & Fuels, 2009, vol. 23, pp. 2307-2315.
Miller et al., "Toward Transformational Carbon Capture," AIChE Journal, 62, 1-10 (2016).
Moreira, "Steam Cracking: Kinetics and Feed Characterization," Dissertation, 2015, 10 pages.
NETL, National Energy Technology Laboratory. U.S. Department of Energy, "Quality Guidelines for Energy System Studies—Specification for Selected Feedstocks." Jan. 2012.
NETL, National Energy Technology Laboratory. U.S. Department of Energy, "Syngas Contaminant Removal and Conditioning," webpage accessed on Jul. 8, 2018.
Nipattummakul et al., "Hydrogen and syngas production from sewage sludge via steam gasification," Fuel and Energy Abstracts, 2010, 35 (21), 11738-11745.
Ockwig et al., "Membranes for Hydrogen Separation," American Chemical Society, Chem. Rev., Oct. 10, 2007, vol. 107, pp. 4078-4110.
O'Connor et al., "Carbon Dioxide Sequestration by Direct Mineral Carbonation: Results from Recent Studies and Currents Status," Abstract, USDOE Office of Fossil Energy, 2001.
Ohio Coal Development Office of the Ohio Air Quality Development Authority, "Ohio Coal Research Consortium (OCRC)—IV, Year 3 Proposal Solicitation," http://www.ohioquality.org/ocdo/other_pdf/Consortium_IV_Year_3_RFP.pdf (2006).
Ortiz et al., "Hydrogen Production by Auto-Thermal Chemical-Looping Reforming in A Pressurized Fluidized Bed Reactor Using Ni-based Oxygen Carriers," International Journal of Hydrogen Energy, 2010, vol. 35, p. 151-160.
Osha, "Hydrogen Sulfide in Workplaces," <https://www.osha.gov/SLTC/hydrogensulfide/hydrogensulfide_found.html> webpage accessed Jul. 8, 2018.
Park et al., "CO2 Mineral Sequestration: Chemically Enhanced Aqueous Carbonation of Serpentine," The Canadian Journal of Chemical Engineering, 2003, vol. 81, pp. 885-890.
Park et al., "CO2 Mineral Sequestration: physically activated dissolution of serpentine and pH swing process," Chemical Engineering Science, 2004, vol. 59, pp. 5241-5247.
Perdew et al., "Generalized gradient approximation made simple," Phys. Rev. Lett., 1996, 77, 3865.
Pfeifer, "Industrial furnaces-status and research challenges." Energy Procedia, 2017, 120: 28-40.
Pröll et al., "Syngas and a separate nitrogen/argon stream via chemical looping reforming—A 140 kW pilot plant study," Fuel, 2010, vol. 89, Issue 6, pp. 1249-1256.
Qin et al., "Enhanced methane monversion in mhemical looping partial oxidation systems using a copper doping modification," Appl. Catal. B, 2018, 235, 143-149.
Qin et al., "Evolution of Nanoscale Morphology in Single and Binary Metal Oxide Microparticles During Reduction and Oxidation Processes," J. Mater. Chem. A. 2014, 2, 17511-17520.
Qin et al., "Impact of 1% Lathanum Dopant on Carbonaceous Fuel Redox Reactions with an Iron-Based Oxygen Carrier in Chemical Looping Processes," ACS Energy Letters, 2017, 2, 70-74.
Qin et al., "Nanostructure Formation Mechanism and Ion Diffusion in Iron—Titanium Composite Materials with Chemical Looping Redox Reactions," J. Mater. Chem. A. 2015, 3, 11302-11312.
Quin et al., "Improved Cyclic redox reactivity of lanthanum modified iron-based oxygen carriers in carbon monoxide xhemical looping combustion," Journal of Materials Chemistry A, 2017, 8 pages.
Rollmann et al., "First-principles calculation of the structure and magnetic phases of hematite," Phys. Rev. B, 2004, 69, 165107.
Rostrup-Nielsen, "Syngas in Perspective," Catalysis Today, 2002, 71(3-4), 243-247.
Ruchenstein et al., "Carbon dioxide reforming of methane over nickel/alkaline earth metal oxide catalysts," Applied Catalysis A, 1995, vol. 133, p. 149-161.
Russo et al., "Impact of Process Design of on the Multiplicity Behavior of a Jacketed Exothermic CSTR," AICHE Journal, Jan. 1995, vol. 41, No. 1, pp. 135-147.
Ryden et al., "Synthesis gas generation by chemical-looping reforming in a continuously operating laboratory reactor," Fuel, 2006, vol. 85, p. 1631-1641.
Sassi et al., "Sulfur Recovery from Acid Gas Using the Claus Process and High Temperature Air Combustion ( HiTAC ) Technology," Am. J. Environ. Sci., 2008, 4, 502-511.
Sattler et al., "Catalytic Dehydrogenation of Light Alkanes on Metals and Metal Oxides," Chem Rev, 2014, 114(20): 10613-10653.
Scott et al., "In situ gasification of a solid fuel and CO2 separation using chemical looping," AICHE Journal, 2006, vol. 52, Issue 9, pp. 3325-3328.
Shen et al., "Chemical-Looping Combustion of Biomass in a 10kWth Reactor with Iron Oxide as an Oxygen Carrier," Energy & Fuels, 2009, vol. 23, pp. 2498-2505.
Shen et al., "Experiments on chemical looping combustion of coal with a NiO based oxygen carrier," Combustion and Flame, 2009, vol. 156, Issue 3, pp. 721-728.
Sheppard et al., "Paths to which the nudged elastic band converges," J. Comput. Chem., 2011, 32, 1769-1771.
Shick et al., "Single crystal growth of $CoCr_2S_4$ and $FeCr_2S_4$," Journal of Crystal Growth, 1969, 5(4): 313-314.
Speight, "Gasification processes for syngas and hydrogen production," Gasification for Synthetic Fuel Production, Woodhead Publishing, 2015, 119-146.

(56) References Cited

OTHER PUBLICATIONS

Sridhar et al., "Syngas Chemical Looping Process: Design and Construction of a 25 kWth Subpilot Unit," Energy Fuels, 2012, 26(4), pp. 2292-2302.
Steinfeld et al., "Design Aspects of Solar Thermochemical Engineering—A case Study: Two-Step Water-Splitting Cycle Using the Fe3O4/FeO Redox System," Solar Energy, 1999, pp. 43-53.
Steinfeld, "Solar hydrogen production via a two-step water-splitting thermochemical cycle based on Zn/ZnO redox reactions," International Journal of Hydrogen Energy, 2002, vol. 27, pp. 611-619.
Sun et al., "Review: Fundamentals and challenges of electrochemical CO2 reduction using two-dimensional materials," Chem, 2017, 3, 560-587.
Takanabe, "Catalytic Conversion of Methane: Carbon Dioxide Reforming and Oxidative Coupling," Journal of the Japan Petroleum Institute, 2012, 55, 1-12.
Thiollier et al., "Preparation and Catalytic Properties of Chromium-Containing Mixed Sulfides," Journal of Catalysis, 2011, 197(1): 58-67.
Tian et al., "Thermodynamic investigation into carbon deposition and sulfur evolution in a Ca-based chemical-looping combustion system," Chemical Engineering Research & Design, 2011, vol. 89, Issue 9, p. 1524.
Trout et al., "Analysis of the Thermochemistry of NOx Decomposition over CuZSM-5 Based on Quantum Chemical and Statistical Mechanical Calculations," J. Phys. Chem, 100(44), 1996, 17582-17592.
U.S. Department of Energy, NCCTI Energy Technologies Group, Office of Fossil Energy, "CO2 Capture and Storage in Geologic Formations," pp. 34, Revised Jan. 8, 2002.
United States Environmental Protection Agency. "Air Pollution Control Technology Fact Sheet: Selective Catalytic Reforming," <https://www3.epa.gov/ttncatc1/cica/files/fscr.pdf> (2003).
Usachev et al., "Conversion of Hydrocarbons to Synthesis Gas: Problems and Prospects," Petroleum Chemistry, 2011, vol. 51, p. 96-106.
Velazquez-Vargas et al., "Atmospheric Iron-based Coal Direct Chemical Looping (CDCL) Process for Power Generation", presented in Power-Gen International 2012, Orlando, FL, Dec. 11-13, 2012, BR-1892, 1-5.
Vernon et al., "Partial Oxidation of Methane to Synthesis Gas," Catalysis Letters, 1990, vol. 6, p. 181-186.
Wang et al., "Highly efficient metal sulfide catalysts for selective dehydrogenation of isobutane to isobutene," ACS Catalysis, 2014, 4: 1139-1143.
Wang et al., "Study of bimetallic interactions and promoter effects of FeZn, FeMn and FeCr Fischer—Tropsch synthesis catalysts," Journal of Molecular Catalysis A: Chemical, 2010, 326:29-40.
Warsito, W. et al., Electrical Capacitance Volume Tomography, 2007, pp. 1-9.
Watanabe, "Electrical properties of $FeCr_2S_4$ and $CoCr_2S_4$," Solid State Communications, 1973, 12(5): 355-358.
Yamazaki et al., "Development of highly stable nickel catalyst for methane-steam reaction under low steam to carbon ratio," Applied Catalyst A, 1996, vol. 136, p. 49-56.
Yin et. al., "A mini-review on ammonia decomposition catalysts for on-site generation of hydrogen for fuel cell applications," Applied Catalysis A: General, 2004, 277, 1-9.
Zafar et al., "Integrated Hydrogen and Power Production with CO2 Capture Using Chemical-Looping ReformingRedox Reactivity of Particles of CuO, Mn2O3, NiO, and Fe2O3 Using SiO2 as a Support," Ind. Eng. Chem. Res., 2005, 44(10), pp. 3485-3496.
Zeng et al., "Metal oxide redox chemistry for chemical looping processe," Nat Rev Chem., 2018, 2, 349-364.
International Preliminary Report on Patentability for International Application PCT/US/2007/000956 dated Jul. 24, 2008.
International Preliminary Report on Patentability for International Application PCT/US/2010/048121 dated Mar. 22, 2012.
International Preliminary Report on Patentability for International Application PCT/US/2010/048125 dated Mar. 22, 2012.
International Preliminary Report on Patentability for International Application PCT/US/2011/059736 dated May 23, 2013.
International Preliminary Report on Patentability for International Application PCT/US/2012/037544 dated Nov. 12, 2013.
International Preliminary Report on Patentability for International Application PCT/US/2012/037557 dated Nov. 21, 2013.
International Search Report and Written Opinion for Application No. PCT/US14/14877 dated May 14, 2014 (10 pages).
International Search Report and Written Opinion for Application No. PCT/US14/25520 dated Jul. 11, 2014 (13 pages).
International Search Report and Written Opinion for Application No. PCT/US14/26071 dated Jul. 10, 2014 (9 pages).
International Search Report and Written Opinion for Application No. PCT/US2007/000956 dated Dec. 4, 2007.
International Search Report and Written Opinion for Application No. PCT/US2009/058579 dated Aug. 3, 2010.
International Search Report and Written Opinion for Application No. PCT/US2010/048121 dated Apr. 1, 2011.
International Search Report and Written Opinion for Application No. PCT/US2010/048125 dated Dec. 17, 2010.
International Search Report and Written Opinion for Application No. PCT/US2011/059736 dated Mar. 27, 2012.
International Search Report and Written Opinion for Application No. PCT/US2012/037544 dated Aug. 10, 2012.
International Search Report and Written Opinion for Application No. PCT/US2012/037557 dated Aug. 13, 2012.
International Search Report and Written Opinion for Application No. PCT/US2014/027839 dated Jul. 24, 2014 (9 pages).
International Search Report and Written Opinion for Application No. PCT/US2014/028217 dated Jul. 28, 2014 (8 pages).
International Search Report and Written Opinion for Application No. PCT/US2015/018123 dated May 8, 2015 (10 pages).
International Search Report and Written Opinion for Application No. PCT/US2017/027241 dated Jul. 10, 2017 (11 pages).
International Search Report and Written Opinion for Application No. PCT/US2017/034503 dated Aug. 15, 2017 (14 pages).
International Search Report and Written Opinion for Application No. PCT/US2019/045438 dated Oct. 31, 2019 (9 pages).
United States Patent Office Action for U.S. Appl. No. 13/394,572 dated Apr. 9, 2014 (26 pages).
United States Patent Office Action for U.S. Appl. No. 13/394,572 dated Aug. 26, 2014 (16 pages).
United States Patent Office Action for U.S. Appl. No. 13/394,572 dated Dec. 30, 2014 (19 pages).
United States Patent Office Action for U.S. Appl. No. 13/394,572 dated Oct. 13, 2015 (21 pages).
United States Patent Office Notice of Allowance for U.S. Appl. No. 13/394,572 dated Dec. 14, 2015 (10 pages).
United States Patent Office Notice of Allowance for U.S. Appl. No. 13/394,572 dated Feb. 22, 2016 (8 pages).
United States Patent Office Action for U.S. Appl. No. 15/162,199 dated Jun. 30, 2016 (10 pages).
United States Patent Office Final Rejection for U.S. Appl. No. 15/162,199 dated Oct. 21, 2016 (9 pages).
United States Patent Office Action for U.S. Appl. No. 13/394,396 dated Dec. 18, 2014 (14 pages).
United States Patent Office Final Rejection for U.S. Appl. No. 13/394,396 dated Jul. 2, 2015 (15 pages).
United States Patent Office Action for U.S. Appl. No. 13/394,396 dated Jan. 15, 2016 (13 pages).
United States Patent Office Notice of Allowance for U.S. Appl. No. 13/394,396 dated Aug. 3, 2016 (8 pages).
United States Patent Office Action for U.S. Appl. No. 15/376,590 dated Mar. 9, 2018 (10 pages).
United States Patent Office Action for U.S. Appl. No. 15/376,590 dated Oct. 19, 2018 (8 pages).
United States Patent Office Notice of Allowance for U.S. Appl. No. 15/376,590 dated Jan. 9, 2019 (6 pages).
Final Rejection pertaining to U.S. Appl. No. 13/121,009 dated Mar. 14, 2013.
Advisory Action pertaining to U.S. Appl. No. 13/121,009 dated Jun. 24, 2013.

(56) References Cited

OTHER PUBLICATIONS

Office Action pertaining to U.S. Appl. No. 13/121,009 dated Sep. 13, 2013.
Final Rejection pertaining to U.S. Appl. No. 13/121,009 dated Jan. 16, 2014.
Office Action pertaining to U.S. Appl. No. 13/121,009 dated Sep. 6, 2012.
United States Patent Office Notice of Allowance for U.S. Appl. No. 14/504,295 dated Sep. 28, 2015 (10 pages).
United States Patent Office Action for U.S. Appl. No. 15/191,249 dated Dec. 28, 2017 (14 pages).
United States Patent Office Notice of Allowance for U.S. Appl. No. 15/191,249 dated May 22, 2018 (8 pages).
United States Patent Office Action for U.S. Appl. No. 13/883,795 dated Jun. 20, 2016 (15 pages).
United States Patent Office Action for U.S. Appl. No. 13/883,795 dated Jun. 23, 2017 (11 pages).
United States Patent Office Notice of Allowance for U.S. Appl. No. 13/883,795 dated Jan. 22, 2018 (7 pages).
United States Patent Office Action for U.S. Appl. No. 14/116,627 dated Oct. 20, 2016 (6 Pages).
United States Patent Office Notice of Allowance for U.S. Appl. No. 14/116,627 dated Mar. 10, 2017 (5 pages).
United States Patent Office Notice of Allowance for U.S. Appl. No. 14/116,627 dated Jun. 14, 2017 (5 pages).
United States Patent Office Action for U.S. Appl. No. 15/685,951 dated May 14, 2019 (10 pages).
United States Patent Office Notice of Allowance for U.S. Appl. No. 15/685,951 dated Aug. 12, 2019 (5 pages).
United States Patent Office Final Rejection for U.S. Appl. No. 14/116,636 dated Oct. 24, 2016 (10 pages).
United States Patent Office Notice of Allowance for U.S. Appl. No. 14/116,636 dated Nov. 7, 2017 (5 pages).
United States Patent Office Action for U.S. Appl. No. 14/766,086 dated Jan. 13, 2017 (22 pages).
United States Patent Office Action for U.S. Appl. No. 14/766,086 dated Sep. 7, 2017 (19 pages).
United States Patent Office Action for U.S. Appl. No. 14/766,086 dated Jan. 2, 2018 (21 pages).
United States Patent Office Notice of Allowance for U.S. Appl. No. 14/766,086 dated Aug. 8, 2018 (9 pages).
United States Patent Office Action for U.S. Appl. No. 16/166,746 dated May 1, 2019 (9 pages).
United States Patent Office Notice of Allowance for U.S. Appl. No. 16/166,746 dated Aug. 15, 2019 (8 pages).
United States Patent Office Action for U.S. Appl. No. 14/775,044 dated May 30, 2017 (15 pages).
United States Patent Office Action for U.S. Appl. No. 14/775,044 dated Feb. 26, 2018 (16 pages).
United States Patent Office Action for U.S. Appl. No. 14/774,727 dated Sep. 14, 2017 (10 pages).
United States Patent Office Notice of Allowance for U.S. Appl. No. 14/774,730 dated Nov. 16, 2016 (10 pages).
Office Action pertaining to U.S. Appl. No. 12/160,803 dated Jun. 7, 2011.
Final Rejection pertaining to U.S. Appl. No. 12/160,803 dated Jan. 5, 2012.
Office Action pertaining to U.S. Appl. No. 12/160,803 dated Jun. 5, 2012.
Final Rejection pertaining to U.S. Appl. No. 12/160,803 dated Mar. 22, 2013.
Advisory Action pertaining to U.S. Appl. No. 12/160,803 dated Jul. 11, 2013.
Examiners Answer before the Patent Trial and Appeal Board for U.S. Appl. No. 12/160,803 dated Nov. 4, 2013.

United States Patent Office Action for U.S. Appl. No. 12/160,803 dated Feb. 23, 2016 (27 pages).
United States Patent Office Action for U.S. Appl. No. 14/091,654 dated Jun. 12, 2015 (16 pages).
United States Patent Office Action for U.S. Appl. No. 14/091,654 dated Oct. 30, 2014 (14 pages).
United States Patent Office Action for U.S. Appl. No. 14/091,654 dated Jan. 4, 2016 (17 pages).
United States Patent Office Action for U.S. Appl. No. 14/634,319 dated Nov. 7, 2016 (7 pages).
United States Patent Office Action for U.S. Appl. No. 14/634,319 dated Apr. 11, 2017 (9 pages).
United States Patent Office Action for U.S. Appl. No. 15/647,084 dated Dec. 26, 2017 (7 pages).
United States Patent Office Notice of Allowance for U.S. Appl. No. 15/647,084 dated Mar. 19, 2018 (8 pages).
United States Patent Office Notice of Allowance for U.S. Appl. No. 16/260,447 dated Oct. 21, 2019 (10 pages).
International Search Report mailed in International Patent Application No. PCT/US2018/044530 dated Oct. 17, 2018 (2 pages).
Written Opinion of the International Searching Authority mailed in International Patent Application No. PCT/US2018/044530 dated Oct. 17, 2018 (5 pages).
Faezad Othman et al., "Utilization of Malaysian Low Grade Iron Ore as Medium for Ammonia Decomposition," ARPN Journal of Engineering and Applied Sciences, 2015, 10(22):17286-17288.
Faezad Othman et al., "Utilization of Low-Grade Iron Ore in Ammonia Decomposition," Procedia Chemistry, 2016, 19:119-124.
Mihai et al., "Chemical looping methane partial oxidation: The effect of the crystal size and O content of LaFeO3," Journal of Catalysis, 2012, 293:175-185.
Xu et al., "A novel chemical looping partial oxidation process for thermochemical conversion of biomass to syngas," Applied Energy, 2018, 222:119-131.
Kathe et al., "Modularization strategy for syngas generation in chemical ," AIChE Journal, 2017, 63(8):3343-3360.
International Search Report and Written Opinion for Application No. PCT/US2020/013823 dated Apr. 9, 2020 (16 pages).
United States Patent Office Action for U.S. Appl. No. 16/091,508 dated Feb. 12, 2020 (18 pages).
United States Patent Office Action for U.S. Appl. No. 16/216,911 dated Apr. 16, 2020 (6 pages).
Lockwood Greene, "Ironmaking Process Alternative Screening Study, vol. I: Summary Report," Department of Energy United States of America, Oct. 2000, 153 pages.
Goellner et al., "Baseline analysis of crude methanol production from coal and natural gas," National Energy Technology Laboratory (NETL), US Department of Energy, 2014, 83 pages.
Wang et al., "Isobutane Dehydrogenation over Metal (Fe, Co, and Ni) Oxide and Sulfide Catalysts: Reactivity and Reaction Mechanism," ChemCatChem, Jul. 2014, vol. 6, pp. 2305-2314.
International Search Report and Written Opinion for Application No. PCT/US2020/027324 dated Jul. 9, 2020 (10 pages).
United States Patent Office Action for U.S. Appl. No. 16/091,253 dated Jul. 8, 2020 (13 pages).
United States Patent Office Notice of Allowance for U.S. Appl. No. 16/216,911 dated Sep. 17, 2020 (8 pages).
Lin et al., "Novel Magnetically Separable Mesoporous Fe2O3@SBA-15 Nanocomposite with Fully Open Mesochannels for Protein Immobilization," Chemistry of Materials, 2008, vol. 20, pp. 6617-6622.
International Search Report and Written Opinion for Application No. PCT/US2020/046918 dated Nov. 24, 2020 (12 pages).
European Patent Office Extended Search Report for Application No. 18840907.2 dated Dec. 14, 2020 (8 pages).
United States Patent Office Notice of Allowance for U.S. Appl. No. 16/091,253 dated Jan. 27, 2021 (8 pages).

* cited by examiner

REACTOR SYSTEM WITH UNEQUAL REACTOR ASSEMBLY OPERATING PRESSURES

CROSS-REFERENCE TO RELATED APPLICATION(S)

The present application is a U.S. national stage entry of International Patent Application No. PCT/US2018/044530, filed on Jul. 31, 2018, which claims priority, to the extent appropriate, to each of the following applications: U.S. Provisional Patent Application No. 62/539,374, filed Jul. 31, 2017; U.S. Provisional Patent Application No. 62/565,565, filed Sep. 29, 2017; and U.S. Provisional Patent Application No. 62/589,144, filed Nov. 21, 2017, wherein the disclosure of each application is hereby incorporated by reference in their entirety.

TECHNICAL FIELD

The present disclosure relates to systems and methods for reactor systems involving solid particles circulating between reactor assemblies. More particularly, the present disclosure relates to reactor systems in which two or more reactors operate at unequal pressures.

INTRODUCTION

For most reaction systems, the choice of an operating pressure to produce desired product is a part of the system design. Operating pressure directly affects the system performance and economics. For example, in a methane to syngas chemical looping system, an increase in reducer reactor pressure from 1 atm to 10 atm increases the kinetics of methane conversion by a factor of '2'. However, an increase in the reducer pressure from 1 atm to 10 atm, leads to a decrease in the maximum thermodynamic equilibrium conversion of methane to syngas.

In addition to affecting intrinsic parameters like thermodynamic equilibrium, reaction kinetics and net system heat balance, the choice of operating pressure affects the compression costs and energy consumption associated with a reactor system. For example, typical syngas supply pressure requirements are 30 atm when integrating a methane-to-syngas chemical looping system in a Fischer-Tropsch based gas-to-liquids plant. If the methane to syngas system operates at 30 atm, significant air compression energy is required for re-oxidizing the reduced metal-oxide at 30 atm in order to maintain solids circulation. Alternatively, a chemical looping system operating at 1 atm requires a syngas compressor to compress the syngas produced from 1 atm to 30 atm. At intermediate pressures between 1 atm and 30 atm, a combination of syngas compressors and air compressors are necessary for operating previously implemented chemical looping systems.

Depending on the choice of operating pressure and the energy recovery scheme, compressors and/or expanders can cumulatively cost 40%-70% of the total reactor system capital cost. In another example, in a chemical looping combustion system with $CO_2$ capture, the Ohio State coal direct chemical looping (CDCL) system had an energy penalty of 10.6% relative to a baseline supercritical plant with no $CO_2$ capture. Around half of this energy penalty came from compressing the $CO_2$ in the reducer reactor outlet from near atmospheric pressure to ~150 atm, typical for sequestration requirements. The cost of a $CO_2$ compressor for the CDCL application is ~80% that of the CDCL reducer reactor. In general, for reactor systems designed to generate product at pressures higher than atmospheric pressure, the compression costs play a significant role in determining the overall economics and energy efficiency.

SUMMARY

The present application discloses reactor systems and methods for operating reactor systems. Specifically, the present application discloses reactor systems, comprising (a) a first reactor assembly, which comprises one or more first reactor assembly reactors, each configured to operate at a pressure P1, wherein the first reactor assembly is configured to receive first solid particles at the pressure P1, convert the first solid particles at the pressure P1 to second solid particles at the pressure P1, and discharge the second solid particles at the pressure P1, (b) a first pressure transition assembly in fluid communication with the first reactor assembly and a second reactor assembly, wherein the first pressure transition assembly is configured to receive the second solid particles at the pressure P1, transition the pressure surrounding the second solid particles from the pressure P1 to a pressure P2 that is different from the pressure P1, and discharge the second solid particles at the pressure P2, (c) the second reactor assembly, which comprises one or more second reactor assembly reactors, each configured to operate at the pressure P2, wherein the second reactor assembly is configured to receive the second solid particles at the pressure P2, convert the second solid particles at the pressure P2 to third solid particles at the pressure P2, and discharge the third solid particles at the pressure P2, and a second pressure transition assembly in fluid communication with the second reactor assembly and the first reactor assembly, the second pressure transition assembly configured to receive third solid particles at the pressure P2, transition the pressure surrounding the third solid particles from the pressure P2 to a pressure P3 that is different from the pressure P2, and discharge the third solid particles at the pressure P3 from the second pressure transition assembly.

The first pressure transition assembly of the reactor systems of the present disclosure may include a first nonmechanical valve, a first mechanical valve, a second nonmechanical valve and a second mechanical valve. The first nonmechanical valve may be positioned between and in fluid communication with the first reactor assembly and the first mechanical valve. The first mechanical valve may be operable in an open and a closed position. The second nonmechanical valve may be positioned between and in fluid communication with the first nonmechanical valve and the first mechanical valve. The second mechanical valve may be operable in an open and closed position. The second nonmechanical valve further may include a gas inlet for receiving pressurized inert gas that is operable in an open and closed position, and a second nonmechanical valve gas outlet for releasing pressurized gas that is operable in an open and closed position.

The first pressure transition assembly of the reactor systems of the present disclosure further may comprise at least one additional nonmechanical valve in fluid communication with and positioned between the first reactor assembly and the first nonmechanical valve, the first nonmechanical valve and the first mechanical valve, the first mechanical valve and the second nonmechanical valve, the second nonmechanical valve and the second mechanical valve, and the second mechanical valve and the second reactor assembly.

The first pressure transition assembly of the reactor systems of the present disclosure may operate in (a) a first mode wherein the pressure within the first and second nonmechanical valves is P1, the first mechanical valve is in a closed position, and a first plurality of the second solid particles at the pressure P1 are received by the first nonmechanical valve in a manner that prevents the first plurality of the second solid particles at the pressure P1 from coming into direct contact with the first mechanical valve, (b) a second mode wherein the first mechanical valve is in an open position, the second mechanical valve is in a closed position, the second nonmechanical valve gas inlet is in a closed position, and the second nonmechanical valve gas outlet is in a closed position, wherein the first nonmechanical valve is configured to discharge the first plurality of the second solid particles at the pressure P1 through the first mechanical valve and into the second nonmechanical valve, wherein subsequently the second nonmechanical valve receives the first plurality of the second solid particles at the pressure P1 in a manner that prevents the first plurality of the second solid particles at the pressure P1 from directly contacting the first or second mechanical valves, (c) a third mode wherein the first and second mechanical valves are in the closed position, the second nonmechanical valve gas inlet is in the closed position, and the second nonmechanical valve gas outlet is in the open position, whereupon the pressure surrounding the first plurality of the second solid particles in the second nonmechanical valve is transitioned from the pressure P1 to the pressure P2, (d) a fourth mode, wherein the first mechanical valve is in the closed position, the second mechanical valve is in the open position, and the second nonmechanical valve gas inlet and second nonmechanical valve gas outlet are each in the closed position, whereupon the second nonmechanical valve is configured to discharge the first plurality of the second solid particles at the pressure P2 from the second nonmechanical valve and through the second mechanical valve, and (e) a fifth mode, wherein the first and second mechanical valves are each in the closed position, the second nonmechanical valve gas inlet is in the open position, and the second nonmechanical valve gas outlet is in the closed position, whereupon the pressure within the second nonmechanical valve transitions from the pressure P2 to the pressure P1.

The second pressure transition assembly of the reactor systems of the present disclosure may include a third nonmechanical valve, a third mechanical valve, a fourth nonmechanical valve and a fourth mechanical valve. The third nonmechanical valve may be positioned between and in fluid communication with the second reactor assembly and the third mechanical valve. The third mechanical valve may be operable in an open and a closed position. The fourth nonmechanical valve may be positioned between and in fluid communication with the third mechanical valve and the fourth mechanical valve. The fourth mechanical valve may be operable in an open and closed position. The fourth nonmechanical valve further may include a fourth nonmechanical valve gas inlet for receiving pressurized inert gas that is operable in an open and closed position, and a fourth nonmechanical valve gas outlet for releasing pressurized gas that is operable in an open and closed position.

The second pressure transition assembly of the reactor systems of the present disclosure further may comprise at least one additional nonmechanical valve in fluid communication with and positioned between the second reactor assembly and the third nonmechanical valve, the third nonmechanical valve and the third mechanical valve, the third mechanical valve and the fourth nonmechanical valve, and the fourth nonmechanical valve and the fourth mechanical valve.

The second pressure transition assembly of the reactor systems of the present disclosure further may operate in (a) a first mode wherein the pressure within the third and fourth nonmechanical valves is P2, the third mechanical valve is in a closed position, and a first plurality of the third solid particles at the pressure P2 are received by the third nonmechanical valve in a manner that prevents the first plurality of the third solid particles at the pressure P2 from coming into direct contact with the third mechanical valve, (b) a second mode wherein the third mechanical valve is in an open position, the fourth mechanical valve is in a closed position, the fourth nonmechanical valve gas inlet is in a closed position, and the fourth nonmechanical valve gas outlet is in a closed position, wherein the third nonmechanical valve is configured to discharge the first plurality of the third solid particles at the pressure P2 through the third mechanical valve and into the fourth nonmechanical valve, wherein subsequently the fourth nonmechanical valve receives the first plurality of the third solid particles at the pressure P2 in a manner that prevents the first plurality of the third solid particles at the pressure P2 from coming into direct contact with the third or fourth mechanical valves, (c) a third mode wherein the third and fourth mechanical valves are in the closed position, and either the fourth nonmechanical valve gas outlet or the fourth nonmechanical valve gas inlet is in the open position, whereupon the pressure surrounding the first plurality of third solid particles in the fourth nonmechanical valve is transitioned from the pressure P2 to the pressure P3, (d) a fourth mode, wherein the third mechanical valve is in the closed position, the fourth mechanical valve is in the open position, and the fourth nonmechanical valve gas inlet and fourth nonmechanical valve gas outlet are each in the closed position, whereupon the fourth nonmechanical valve is configured to discharge the first plurality of the third solid particles at the pressure P3 from the fourth nonmechanical valve and through the fourth mechanical valve, and (e) a fifth mode, wherein the third and fourth mechanical valves are each in the closed position, and either the fourth nonmechanical valve gas inlet or the fourth nonmechanical valve gas outlet is in the open position, whereupon the pressure within the second nonmechanical valve transitions from the pressure P3 to the pressure P2.

The present disclosure also provides methods for operating reactor systems. Specifically, the methods of the present disclosure may comprise (a) providing first solid particles at a pressure P1 to a first reactor assembly, (b) operating the first reactor assembly at the pressure P1, the first reactor assembly including one or more first reactor assembly reactors each configured to operate at the pressure P1, (c) in the first reactor assembly, converting the first solid particles at the pressure P1 to second solid particles at the pressure P1, (d) providing the second solid particles at the pressure P1 to a first pressure transition assembly, (e) in the first pressure transition assembly, transitioning the pressure surrounding the second solid particles from the pressure P1 to a pressure P2 that is different from the pressure P1, (f) discharging the second solid particles at the pressure P2 from the first pressure transition assembly, and providing the second solid particles at the pressure P2 to a second reactor assembly, (g) operating the second reactor assembly at the pressure P2, the second reactor assembly including one or more second reactor assembly reactors each configured to operate at the pressure P2, (h) in the second reactor assembly, converting the second solid particles at the pressure P2 to third solid particles at the pressure P2, (i) providing the third solid particles at the pressure P2 to a second pressure transition assembly, (j) in the second pressure transition assembly, transitioning the pressure surrounding the third solid particles from the pressure P2 to a pressure P3 that is different from the pressure P2, and (k) discharging the third solid particles at the pressure P3 from the second pressure transition assembly.

The first pressure transition assembly of the methods of the present disclosure may include a first nonmechanical valve, a first mechanical valve, a second nonmechanical valve and a second mechanical valve, where the first nonmechanical valve is positioned between and in fluid communication with the first reactor assembly and the first mechanical valve, the first mechanical valve is operable in an open and a closed position, the second nonmechanical valve is positioned between and in fluid communication with the first mechanical valve and the second mechanical valve, and the second mechanical valve is operable in an open and closed position, and wherein the second nonmechanical valve further includes a second nonmechanical valve gas inlet for receiving pressurized inert gas that is operable in an open and closed position, and a second nonmechanical valve gas outlet for releasing pressurized gas that is operable in an open and closed position, and the the methods further may comprise the following steps in sequential order: (a) receiving at the first nonmechanical valve a first plurality of the second solid particles at the pressure P1 when the first mechanical valve is in the closed position and the pressure within the first nonmechanical valve is P1, wherein the first plurality of the second solid particles at the pressure P1 is received in a manner that prevents the first plurality of the second solid particles at the pressure P1 from coming into direct contact with the first mechanical valve when the first mechanical valve is in the closed position, (b) opening the first mechanical valve when the pressure within the first nonmechanical valve is P1, the pressure within the second nonmechanical valve is P1, the second mechanical valve is in the closed position, the second nonmechanical valve gas inlet is in the closed position and the second nonmechanical valve gas outlet is in the closed position, (c) discharging the first plurality of the second solid particles at the pressure P1 from the first nonmechanical valve, through the first mechanical valve, and into the second nonmechanical valve, whereupon the second nonmechanical valve subsequently receives the first plurality of the second solid particles at the pressure P1 in a manner that prevents the first plurality of the second solid particles at the pressure P1 from directly contacting the first or second mechanical valves, (d) closing the first mechanical valve, (e) opening the second nonmechanical valve gas outlet and transitioning the pressure surrounding the first plurality of the second solid particles in the second nonmechanical valve from the pressure P1 to the pressure P2, (f) closing the second nonmechanical valve gas outlet, (g) opening the second mechanical valve, (h) discharging the first plurality of the second solid particles at the pressure P2 from the second nonmechanical valve and through the second mechanical valve, (i) closing the second mechanical valve, and (j) opening the second nonmechanical valve gas inlet and transitioning the pressure within the second nonmechanical valve from the pressure P2 to the pressure P1.

The second pressure transition assembly of the methods of the present disclosure may include a third nonmechanical valve, a third mechanical valve, a fourth nonmechanical valve and a fourth mechanical valve, wherein the third nonmechanical valve is positioned between and in fluid communication with the second reactor assembly and the third mechanical valve, the third mechanical valve is operable in an open and a closed position, the fourth nonmechanical valve is positioned between and in fluid communication with the third mechanical valve and the fourth mechanical valve, and the fourth mechanical valve is operable in an open and closed position, and wherein the fourth nonmechanical valve further includes a fourth nonmechanical valve gas inlet for receiving pressurized inert gas that is operable in an open and closed position, and a fourth nonmechanical valve gas outlet for releasing pressurized gas that is operable in an open and closed position, and the methods further may comprise the following steps in sequential order: (a) receiving at the third nonmechanical valve a first plurality of the third solid particles at the pressure P2 when the third mechanical valve is in the closed position and the pressure within the third nonmechanical valve is P2, wherein the first plurality of the third solid particles at the pressure P2 is received in a manner that prevents the first plurality of the third solid particles at the pressure P2 from coming into direct contact with the third mechanical valve when the third mechanical valve is in the closed position, (b) opening the third mechanical valve when the pressure within the third nonmechanical valve is P2, the pressure within the fourth nonmechanical valve is P2, the fourth mechanical valve is in the closed position, the fourth nonmechanical valve gas inlet is in the closed position and the fourth nonmechanical valve gas outlet is in the closed position, (c) discharging the first plurality of the third solid particles at the pressure P2 from the third nonmechanical valve, through the third mechanical valve, and into the fourth nonmechanical valve, whereupon the fourth nonmechanical valve subsequently receives the first plurality of the third solid particles at the pressure P2 in a manner that prevents the first plurality of the second solid particles at the pressure P2 from directly contacting the third or fourth mechanical valves, (d) closing the third mechanical valve, (e) opening either the fourth nonmechanical valve gas inlet or the fourth nonmechanical valve gas outlet, and transitioning the pressure surrounding the first plurality of the third solid particles in the fourth nonmechanical valve from the pressure P2 to the pressure P3, (0 closing either the fourth nonmechanical valve gas inlet or the fourth nonmechanical valve gas outlet, (g) opening the fourth mechanical valve, (h) discharging the first plurality of the third solid particles at the pressure P3 from the fourth nonmechanical valve and through the fourth mechanical valve, (i) closing the fourth mechanical valve, and (j) opening either the fourth nonmechanical valve gas inlet or the fourth nonmechanical valve gas outlet, and transitioning the pressure within the fourth nonmechanical valve from the pressure P3 to the pressure P2.

Other aspects of the reactor systems and methods for operating reactor systems are described in detail below, are shown in the drawings, and are defined by the claims.

DETAILED DESCRIPTION

Figure 1:
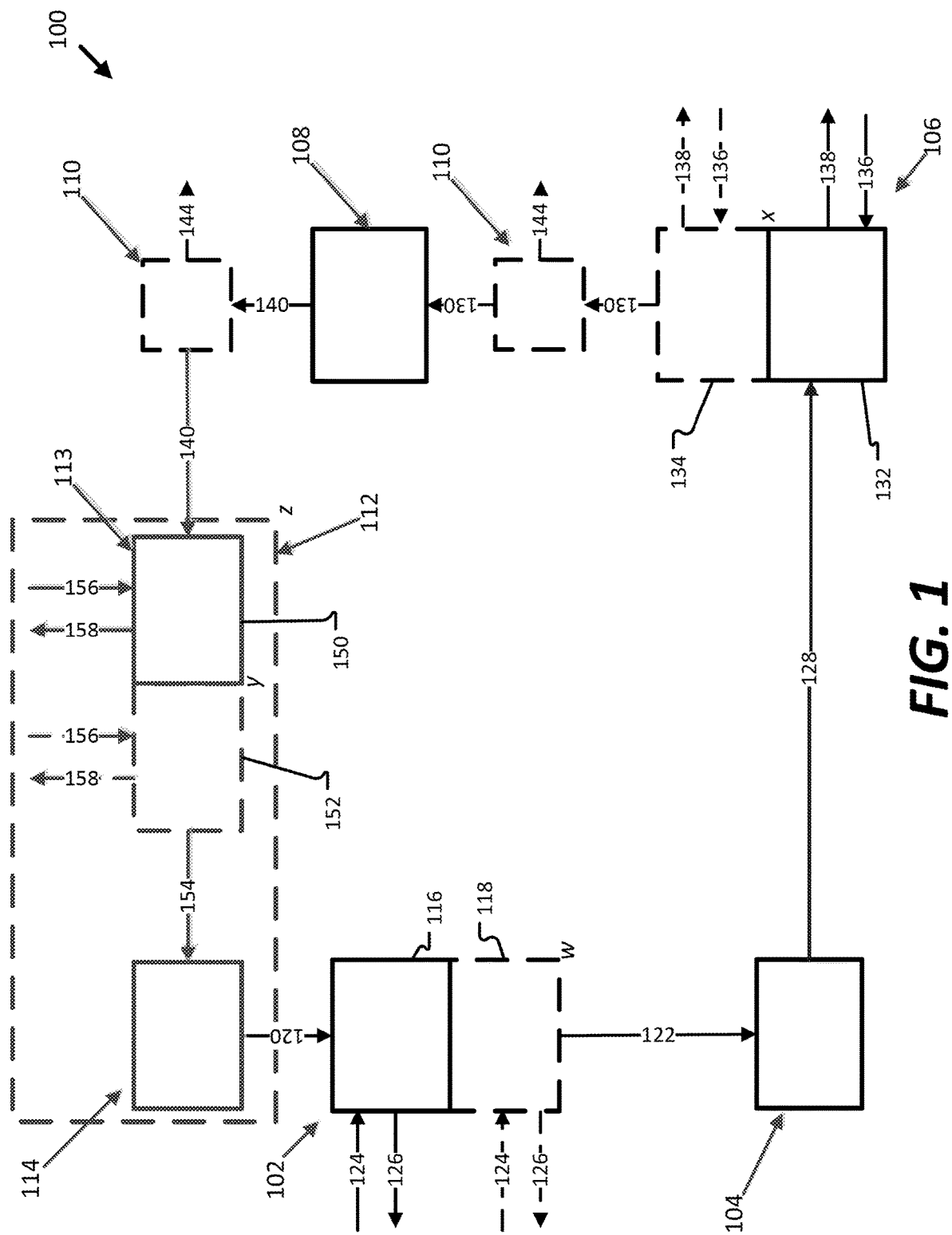
FIG. 1 is a schematic diagram of an example reactor system.

Disclosed herein are looped reactor systems and methods for operating reactor systems that include a first reactor assembly, a first pressure transition assembly, a second reactor assembly and a second pressure transition assembly. The first reactor assembly is configured to operate at a pressure P1, wherein the first reactor assembly is configured to receive first solid particles at a pressure P1, convert the first solid particles at the pressure P1 to second solid particles at the pressure P1, and discharge the second solid particles at the pressure P1. The first pressure transition assembly is in fluid communication with the first reactor assembly and the second reactor assembly, and is configured to receive the second solid particles at the pressure P1, transition the pressure surrounding the second solid particles from the pressure P1 to a pressure P2 that is different from the pressure P1, and discharge the second solid particles at the pressure P2. The second reactor assembly comprises one or more second reactor assembly reactors, each configured to operate at the pressure P2, wherein the second reactor assembly is configured to receive the second solid particles at the pressure P2, convert the second solid particles at the pressure P2 to third solid particles at the pressure P2, and discharge the third solid particles at the pressure P2. The second pressure transition assembly is in fluid communication with the second reactor assembly and the first reactor assembly, and is configured to receive third solid particles at the pressure P2, transition the pressure surrounding the third solid particles from the pressure P2 to a pressure P3 that is different from the pressure P2, and discharge the third solid particles at the pressure P3 from the second pressure transition assembly.

As discussed in more detail below, the systems and methods disclosed herein do not require the use high energy consumption compressors to alter the pressures of reactor feedstock streams or reactor product streams. Instead, the reactor systems disclosed herein include pressure transition assemblies, disposed between adjacent reactor assemblies, that allow for the increase and decrease of pressure of solid particles flowing through the reactor assemblies without the use of compressors, so that reactor feedstock streams and reactor product streams can enter and leave the reactor system's reactors at a desired pressure without having to utilize compressors (or compressors with significantly smaller pressure and/or capacity demand). This allows for substantial decreases in the energy required to operate the reactor system, and substantial increases in the overall efficiency of the reactor system. Eliminating compressors for compressing or reactor feedstock and/or product streams may reduce the cost investment by as much as 70% or more, and may reduce the energy penalty for power generation with $CO_2$ capture to as low as 4%.

I. Definitions

Unless otherwise defined, all technical and scientific terms used herein have the same meaning as commonly understood by one of ordinary skill in the art. In case of conflict, the present document, including definitions, will control. Example methods and materials are described below, although methods and materials similar or equivalent to those described herein can be used in practice or testing of the present disclosure. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "an" and "the" include plural references unless the context clearly dictates otherwise. The present disclosure also contemplates other embodiments "comprising," "consisting of" and "consisting essentially of," the embodiments or elements presented herein, whether explicitly set forth or not.

The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4.

As used herein, the term "ambient pressure" refers to the pressure of the external environment at the location at which the system and/or the process of the present disclosure is operated. The ambient pressure is typically atmospheric pressure Definitions of specific functional groups and chemical terms are described in more detail below. For purposes of this disclosure, the chemical elements are identified in accordance with the Periodic Table of the Elements, CAS version, Handbook of Chemistry and Physics, 75$^{th}$ Ed., inside cover, and specific functional groups are generally defined as described therein.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated. For example, when a pressure range is described as being between ambient pressure and another pressure, a pressure that is ambient pressure is expressly contemplated.

II. Reactor Systems

FIG. 1 is a schematic diagram of an exemplary reactor system 100. Reactor system 100 is configured to move solid particles in a loop through a plurality of reactor assemblies, where the solid particles chemically, physically, and/or chemically and physically react with feedstock (e.g., gaseous, liquid and/or solid feedstocks) received by reactors in the reactor system and produce products that are discharged by reactors in the reactor system. Reactor system 100 enables operating adjacent reactor assemblies at different pressures, and receiving feedstock streams and/or discharging product streams at those same pressures without the use of high energy consumption compressor units to increase the pressure of feedstock streams received by the reactor system or product streams discharged by those reactor assemblies.

Reactor system 100 may include at least a first reactor assembly 102, a first pressure transition assembly 104, a second reactor assembly 106, and second pressure transition assembly 108. Reactor system 100 optionally may include other components, including, but not limited to a gas-solids separation unit 110, and/or one or more (up to z) pairs 112 of additional reactor assemblies and pressure transition assemblies (e.g., a third reactor assembly 113 and third pressure transition assembly 114).

The first reactor assembly 102 may comprise one or more first reactor assembly reactors, each configured to operate at a pressure P1, where the first reactor assembly is configured to receive first solid particles at the pressure P1, convert the first solid particles at the pressure P1 to second solid particles at the pressure P1, and discharge the second solid particles at the pressure P1. For example, the first reactor assembly 102 may include a first reactor assembly reactor 116 and optionally w number of additional first reactor assembly reactors 118, each configured to operate at a pressure P1. The first reactor assembly 102 may receive first solid particles at the pressure P1 120, whereupon the first solid particles at the pressure P1 may be converted by the first reactor assembly reactor 116 and optionally the w number of first reactor assembly reactors 118 to second solid particles at the pressure P1 122, which are discharged from the first reactor assembly 102. Those skilled in the art will appreciate that each reactor in the first reactor assembly 102 includes a solids inlet configured to receive solid particles and a solids outlet configured to discharge solid particle from the reactor. In some embodiments, each reactor in the first reactor assembly 102 independently may include a reactor feedstock inlet configured to receive feedstock 124, and/or a reactor product outlet configured to discharge product 126. Feedstock received by a reactor in the first reactor assembly may chemically and/or physically react with solid particles within that reactor to convert the particles to particles having alternative chemical or physical compositions and/or to form a product that may be discharged from the reactor through a reactor product outlet. Those skilled in the art further will appreciate that a net result of the various chemical and/or physical reactions between feedstock 124 and solid particles within the first reactor assembly reactors 116 and 118 is to convert the first particles at the pressure P1 120 to the second particles at the pressure P2 122.

The first pressure transition assembly 104 is in fluid communication with the first reactor assembly 102 and the second reactor assembly 106, and is configured to receive the second solid particles at the pressure P1 122, transition the pressure surrounding the second solid particles from the pressure P1 to a pressure P2 that is different from the pressure P1, and discharge the second solid particles at the pressure P2 128. The pressure P2 is different from the pressure P1. For example, in some embodiments, the pressure P2 is less than pressure P1.

The second reactor assembly 106 may comprise one or more second reactor assembly reactors, each configured to operate at the pressure P2, where the second reactor assembly is configured to receive the second solid particles at the pressure P2 128, convert the second solid particles at the pressure P2 to third solid particles at the pressure P2, and discharge the second third particles at the pressure P2 130. For example, the second reactor assembly 106 may include a second reactor assembly reactor 132 and optionally x number of additional second reactor assembly reactors 134, each configured to operate at a pressure P2. The second reactor assembly 106 may receive second solid particles at the pressure P2 128, whereupon the second solid particles at the pressure P2 may be converted by the second reactor assembly reactor 132 and optionally the x number of second reactor assembly reactors 134 to third solid particles at the pressure P2 130, which are discharged from the second reactor assembly 106. Those skilled in the art will appreciate that each reactor in the second reactor assembly 106 includes a solids inlet configured to receive solid particles and a solids outlet configured to discharge solid particle from the reactor. In some embodiments, each reactor in the second reactor assembly 106 independently may include a reactor feedstock inlet configured to receive feedstock 136, and/or a reactor product outlet configured to discharge product 138. Feedstock received by a reactor in the second reactor assembly may chemically and/or physically react with solid particles within that reactor to convert the particles to particles having alternative chemical or physical compositions and/or to form a product that may be discharged from the reactor through a reactor product outlet. Those skilled in the art further will appreciate that a net result of the various chemical and/or physical reactions between feedstock 136 and solid particles within the second reactor assembly reactors 132 and 134 is to convert the second particles at the pressure P2 128 to the third particles at the pressure P2 130.

The second pressure transition assembly 108 is in fluid communication with the first reactor assembly 102 and the second reactor assembly 106, and is configured to receive the third solid particles at the pressure P2 130, transition the pressure surrounding the third solid particles from the pressure P2 to a pressure P3 that is different from the pressure P2, and discharge the third solid particles at the pressure P3 140. In some embodiments, the pressure P3 is the same as the pressure P1, such that the second pressure transition assembly 108 is configured to transition the pressure surrounding the third solid particles from the pressure P2 to the pressure P1 and discharge the third solid particles at the pressure P1 from the second pressure transition assembly, and wherein the third solid particles at the pressure P1 are the first solid particles at the pressure P1 received by the first reactor assembly. In such embodiments, the reactor system 100 may not include any reactor assembly 112 or pressure transition assembly 114 (i.e., n may be equal to 0).

As noted above, the reactor system 100 optionally may include a gas-solids separation unit 110 between and in fluid communication with the second reactor assembly 106 and the first reactor assembly 102. The gas-solids separation unit 110 may include a separation unit solids inlet configured to receive the third solid particles at either the pressure P2 130 or the pressure P3 140, a separation unit gas outlet configured to discharge gas surrounding the third particles from the gas-solids separation unit 144, and a separation unit solids outlet configured to discharge the third particles at either the pressure P2 130 or the pressure P3 140, respectively, from the gas-solids separation unit.

Also as noted above, the reactor system 100 optionally may include one or more (up to z) pairs 112 of additional reactor assemblies and pressure transition assemblies. The n pairs are configured to receive the third particles at the pressure P3 140, and discharge the first particles at the pressure P1 120. To do this, the z pairs of additional reactor assemblies collectively function to chemically and/or physically convert the third particles to the first particles, and the n number of pressure transition assemblies collectively function to transition the pressure surrounding the particles from the pressure P3 to the pressure P1.

For example, the reactor system 100 may include a third reactor assembly 113, which comprises one or more third reactor assembly reactors, each configured to operate at the pressure P3, wherein the third reactor assembly is configured to receive the third solid particles at the pressure P3, convert the third solid particles at the pressure P3 to the first solid particles at the pressure P3, and discharge the first solid particles at the pressure P3. Similar to reactor assemblies 102 and 106, third reactor assembly 113 may include a third reactor assembly reactor 150 and optionally y number of additional third reactor assembly reactors 152, each configured to operate at the pressure P3. The third reactor assembly 113 may receive the third solid particles at the pressure P3 140, whereupon the third solid particles at the pressure P3 may be converted by the third reactor assembly reactor 150 and optionally the y number of third reactor assembly reactors 152 to the first solid particles at the pressure P3 154, which are discharged from the third reactor assembly 113. Those skilled in the art will appreciate that each reactor in the third reactor assembly 113 includes a solids inlet configured to receive solid particles and a solids outlet configured to discharge solid particle from the reactor. In some embodiments, each reactor in the third reactor assembly 113 independently may include a reactor feedstock inlet configured to receive feedstock 156, and/or a reactor product outlet configured to discharge product 158. Feedstock received by a reactor in the third reactor assembly may chemically and/or physically react with solid particles within that reactor to convert the particles to particles having alternative chemical or physical compositions and/or to form a product that may be discharged from the reactor through a reactor product outlet. Those skilled in the art further will appreciate that a net result of the various chemical and/or physical reactions between feedstock 156 and solid particles within the third reactor assembly reactors 150 and 152 is to convert the third particles at the pressure P3 140 to the first particles at the pressure P3 154.

The third pressure transition assembly 114 is in fluid communication with the third reactor assembly 113 and the first reactor assembly 102, and is configured to receive the first solid particles at the pressure P3 154, transition the pressure surrounding the first solid particles from the pressure P3 to the pressure P1, and discharge the first solid particles at the pressure P1 120.

It should be readily apparent from FIG. 1 that the z pairs 112 of additional reactor assemblies and pressure transition assemblies may include any desired number n of pairs 112. Each pair may function to chemically and/or physically convert the particles received by the pair to particles having alternative chemical and/or physical compositions that are subsequently discharged by the pair. Each pair also functions to transition the pressure surrounding the particles from one pressure to another.

During steady state operation of the reactor system 100, each of the various pressure transition assemblies 104, 108, and 114 may be configured to either discharge solid particles at a constant and continuous flow rate or in batches during steady state operation.

A. Pressure Transition Assemblies

Figure 2:
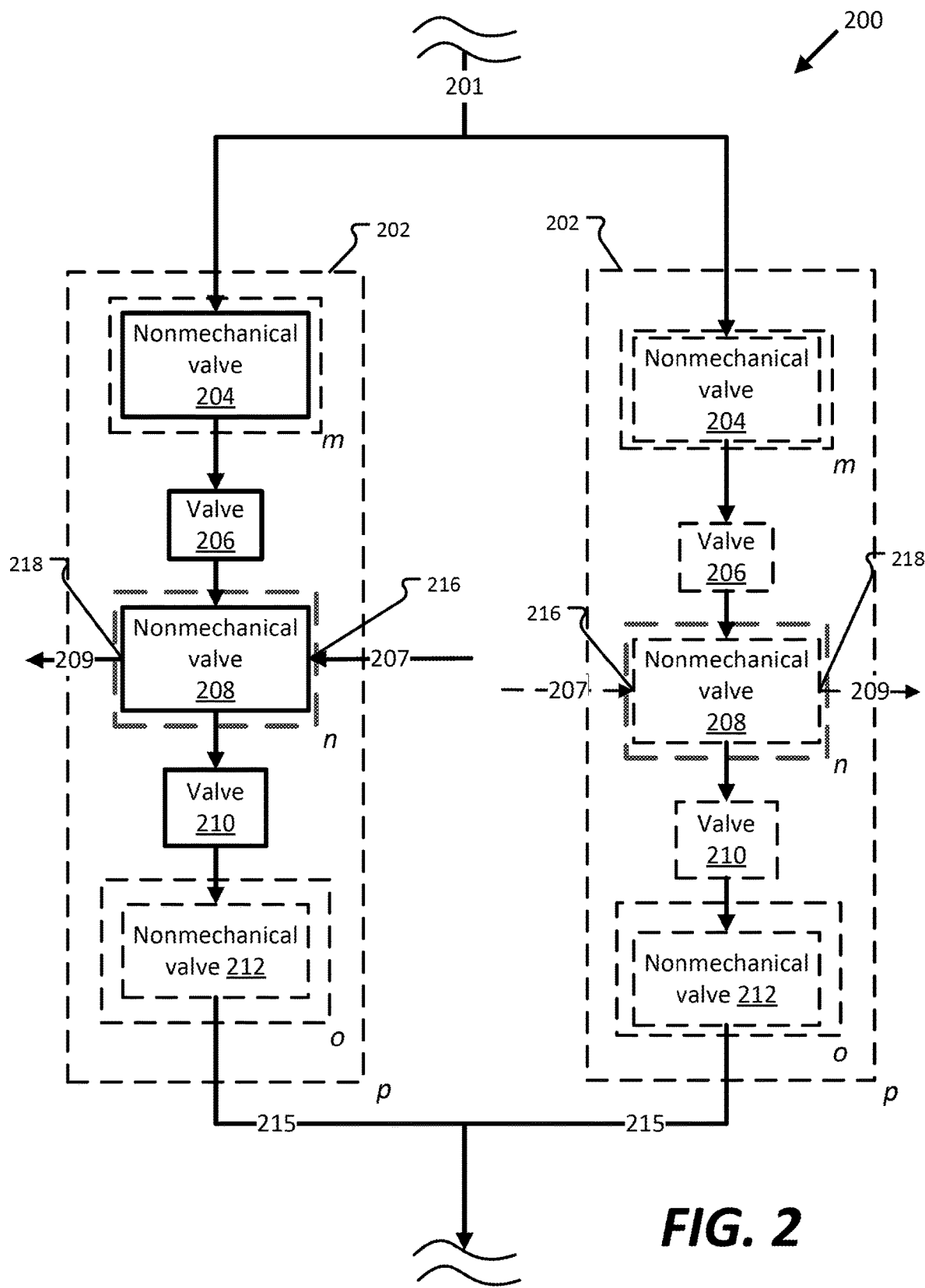
FIG. 2 is a schematic diagram of example pressure transition assembly system of the reactor system of FIG. 1.
Figure 3:
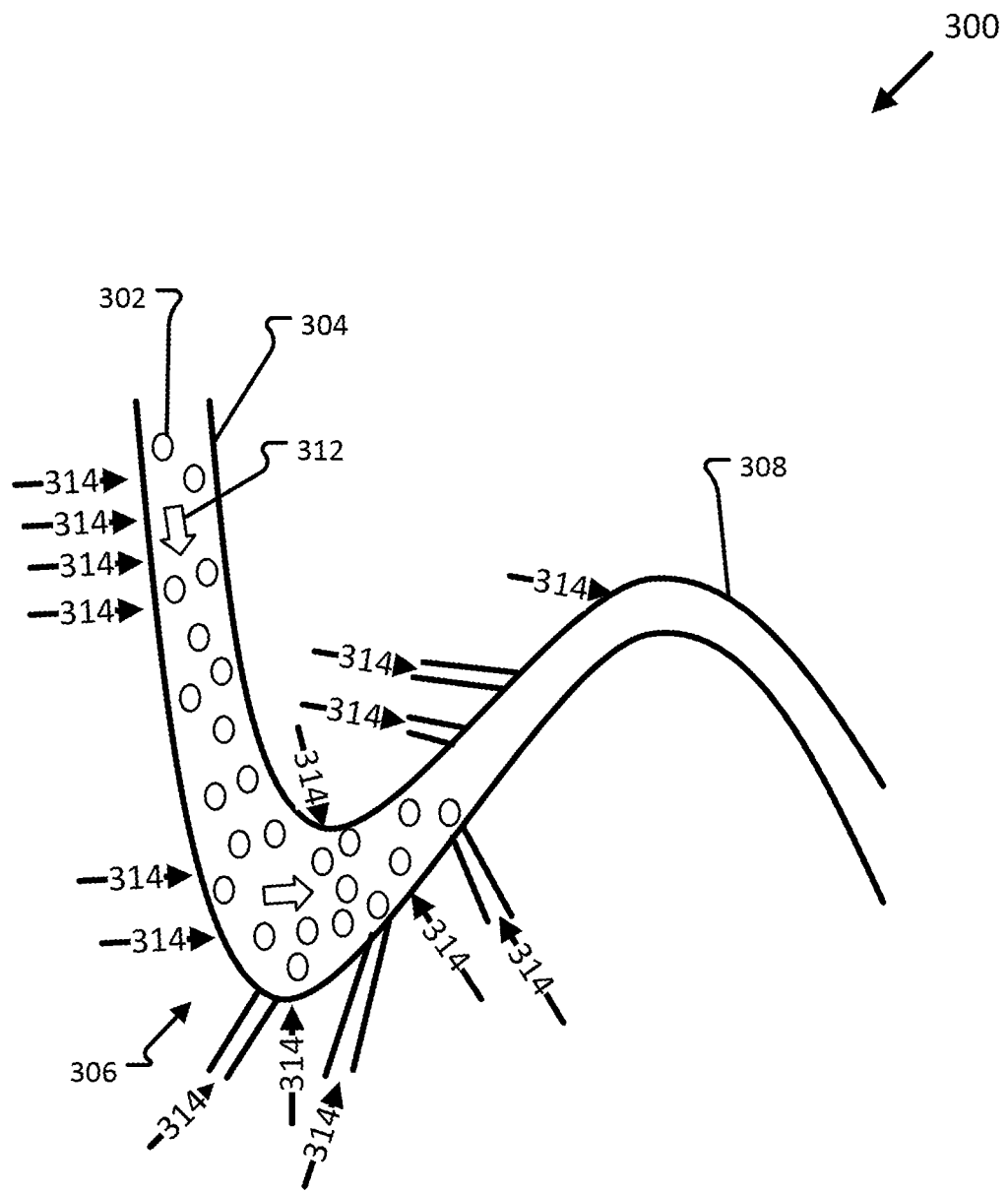
FIG. 3 is a schematic diagram of an exemplary nonmechanical valve used in the pressure transition assembly system of FIG. 2.
Figure 4:
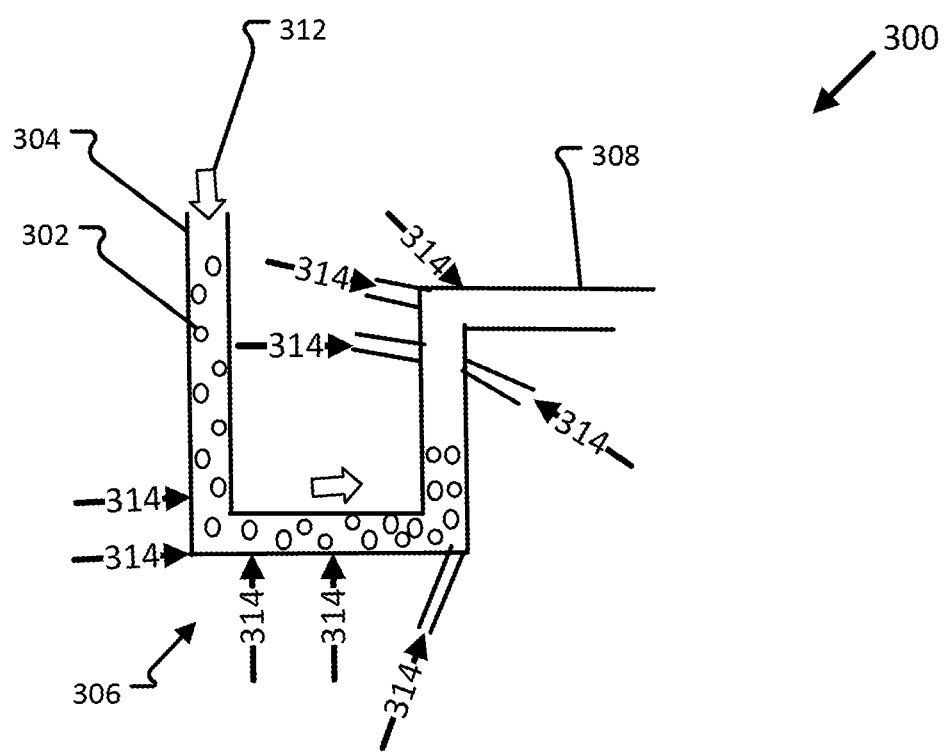
FIG. 4 is another schematic diagram of an exemplary nonmechanical valve used in the pressure transition assembly system of FIG. 2.
Figure 5:
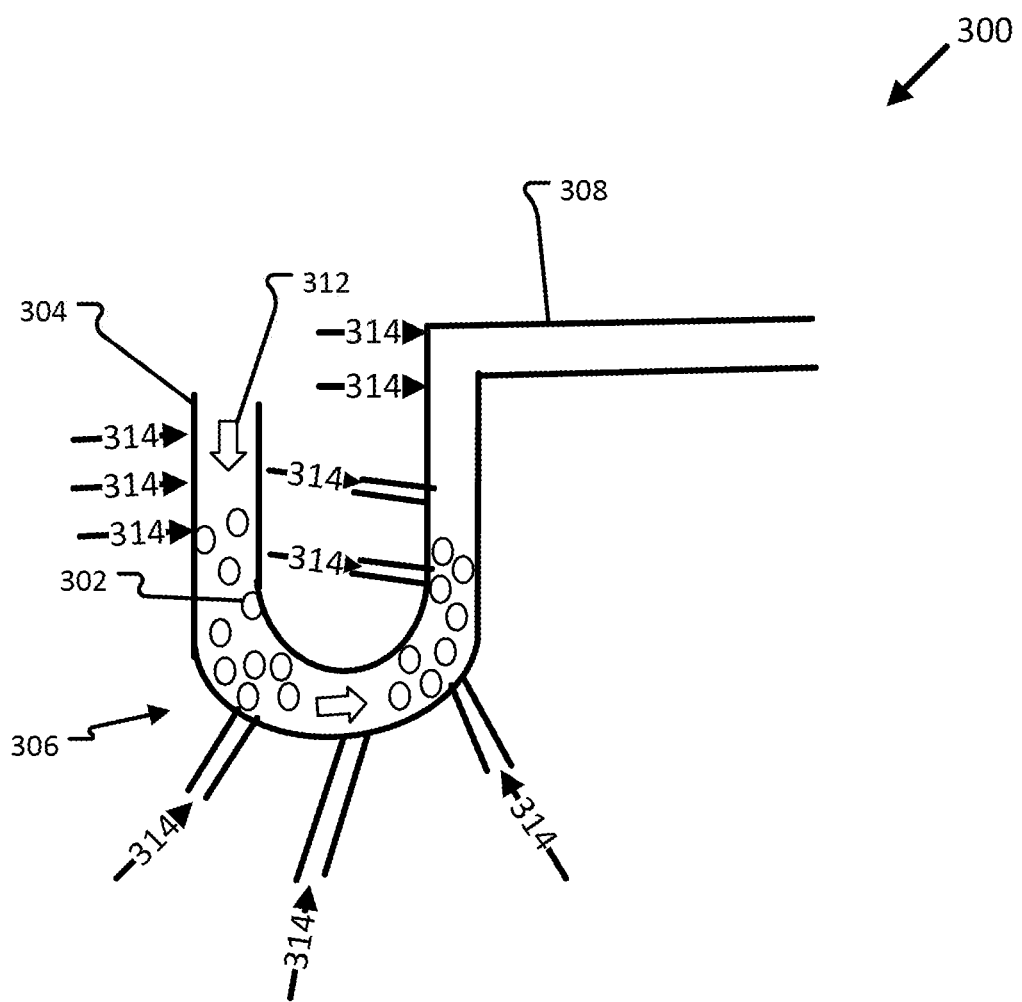
FIG. 5 is another schematic diagram of an exemplary nonmechanical valve used in the pressure transition assembly system of FIG. 2.
Figure 6:
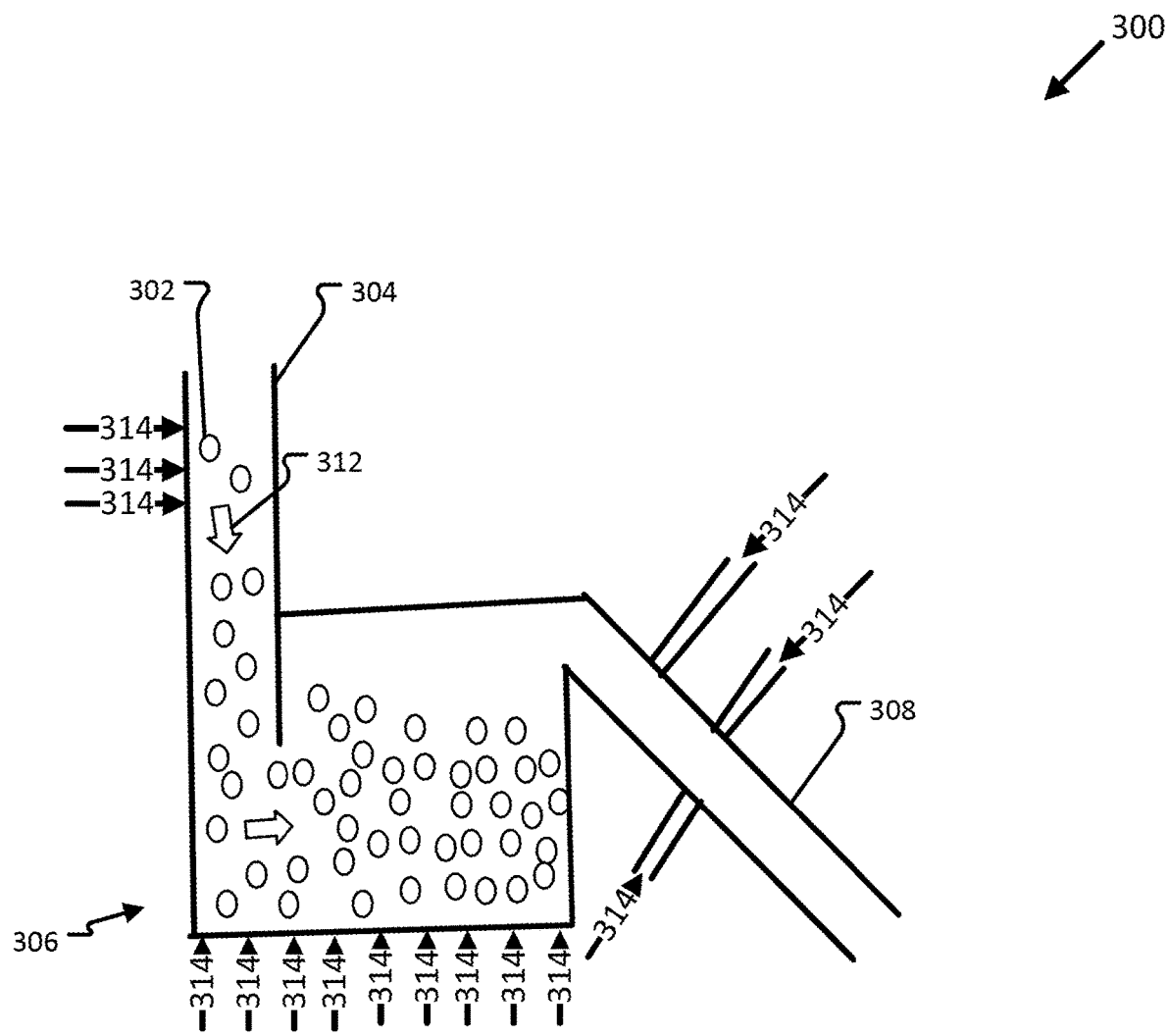
FIG. 6 is another schematic diagram of an exemplary nonmechanical valve used in the pressure transition assembly system of FIG. 2.
Figure 7:
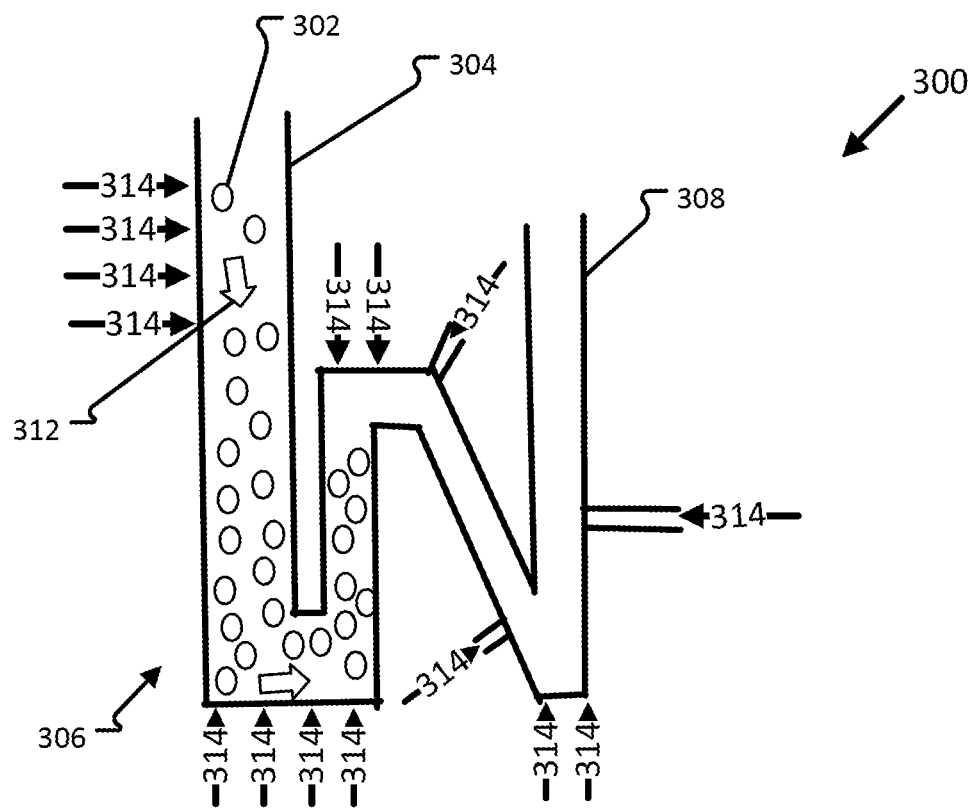
FIG. 7 is another schematic diagram of an exemplary nonmechanical valve used in the pressure transition assembly system of FIG. 2.
Figure 8:
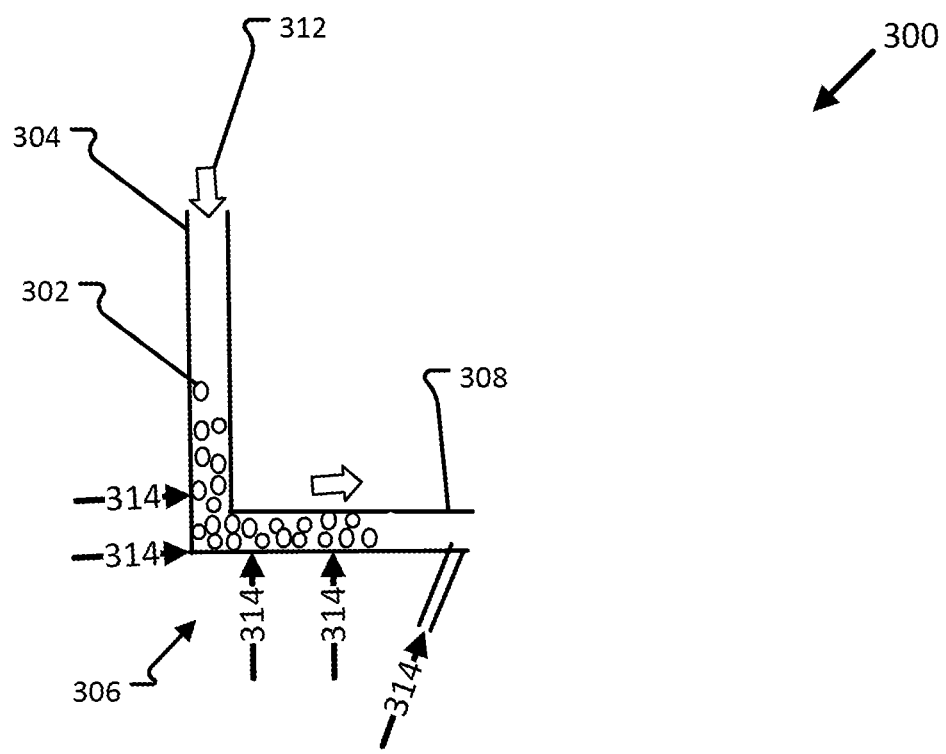
FIG. 8 is another schematic diagram of an exemplary nonmechanical valve used in the pressure transition assembly system of FIG. 2.

FIG. 2 is a schematic diagram of an exemplary pressure transition assembly system 200 that may be used for any or all of pressure transition assemblies 104, 108 and 114. Pressure transition assembly 200 is configured to receive solid particles at a first pressure $P_m$ 201, transition the pressure surrounding the particles to a second different pressure $P_n$, and discharge the particles at the second pressure $P_n$ 215. Each pressure transition assembly includes at least a first assembly 202 comprising a first nonmechanical valve 204, a first mechanical valve 206, a second nonmechanical valve 208, and a second mechanical valve 210, wherein the first nonmechanical valve 204 is positioned between and in fluid communication with the upstream reactor assembly (not shown) and the first mechanical valve 206, the first mechanical valve 206 is operable in an open and a closed position, the second nonmechanical valve 208 is positioned between and in fluid communication with the first mechanical valve 206 and the second mechanical valve 210, and the second mechanical valve 210 is operable in an open and closed position, and wherein the second nonmechanical valve 208 further includes a second nonmechanical valve gas inlet 216 for receiving pressurized inert gas 207, where the inlet 216 is operable in an open and closed position, and a second nonmechanical valve gas outlet 218 for releasing pressurized gas 209, where the outlet 218 is operable in an open and closed position.

Each assembly 202 optionally may include at least one additional nonmechanical valve in fluid communication with and positioned between: (a) the upstream reactor assembly and the first nonmechanical valve, (b) the first nonmechanical valve and the first mechanical valve, (c) the first mechanical valve and the second nonmechanical valve, the second nonmechanical valve and the second mechanical valve, and the second mechanical valve and the downstream reactor assembly. For example, as shown in FIG. 2, the first nonmechanical assembly 202 optionally may include a plurality m of first nonmechanical valves 204 in series, a plurality n of second nonmechanical valves 208 in series, a third nonmechanical valve 212 positioned between and in fluid communication with the second mechanical valve 210 and a downstream reactor assembly (not shown), or a plurality o of third nonmechanical valves 212 in series.

In some embodiments, pressure transition assembly 200 may include a plurality m of assemblies 202 in series. In some embodiments, pressure transition assembly 200 also may include a plurality of assemblies 202 in parallel, where each of the plurality of assemblies 202 may be configured the same or differently from each other.

In some embodiments, in order to reduce the volume and residence time of the nonmechanical valves, and in order to reduce the demand of solids particles used in the system and the heat loss from the nonmechanical valves, each nonmechanical valve in the pressure transition assembly is similarly sized. In some embodiments, the flow rate of solid particles through the nonmechanical valves is similar.

Generally, a nonmechanical valve, such as nonmechanical valve 204, 208 and/or 212, is an assembly that includes a solids inlet for receiving solid particles, a solids outlet for discharging solid particles, various conduits, at least one retaining portion, and one or more inlets for receiving flow gases, where the assembly enables selective control of the flow of solids through the nonmechanical valve. Exemplary nonmechanical valves are shown in FIGS. 3-8 and are described in more detail below.

Generally, the mechanical valves 206 and 210 are selectively actuatable valves that can be actuated between an open position and a closed position. The mechanical valves may be operated manually or using a controller. Mechanical valves are well known in the art, and include such valves as solenoid valves, air or electricity actuated control valves, ball valves, gate valves, butterfly valves, check valves, and the like. The particular type of mechanical valve may be selected based on its tolerance to the operating conditions of the reactor system.

Each pressure transition assembly of the present disclosure may comprise one or more flow gas inlets, each configured to provide a flow gas to move particles within the transition assemblies through various portions of the transition assemblies. Flow gases for moving particles through reactor systems are well known in the art, and include, for example, aeration gases and lubrication gases for moving particles through the reactor system. Flow gases also may include purge gases for purging particles from nonmechanical as well as mechanical valves. Purging gases are particularly important for purging particles from mechanical valves so as to prevent the particles for damaging the mechanical valves when they are actuated between open and closed positions. Flow gases may include, but are not limited to, inert gases that do not react with the particles in the reactor system, such as nitrogen, or in some embodiments steam. Flow gases may be introduced into the pressure transition assembly through flow gas inlets that, for example, may be controlled with flow gas inlet valves that may be selectively actuated, such as with a control assembly. Flow gas inlets may be provided at one or more locations in nonmechanical valves and conduits between nonmechanical valves. Flow gas inlets are shown in FIGS. 3-8 and are described in more detail below. The source of flow gases may be storage tanks containing the inert gas, where the pressure of the inert gas passing through the flow gas inlet is regulated by a regulator.

The pressure surrounding the solid particles is transitioned from $P_m$ to $P_n$ within the second nonmechanical valve 208 when the first mechanical valve 206 and second mechanical valve 210 are each in the closed position. As described in more detail below, nonmechanical valve 208 receives solid particles from nonmechanical valve 204 via valve 206. Nonmechanical valve 208 also includes a gas inlet 216 configured to receive pressurized inert gas 207, where the gas inlet 216 is operable in an open position and in a closed position. Nonmechanical valve 208 also includes gas outlet 218 configured to release pressurized gas 209, where the gas outlet 218 is operable in an open position and a closed position.

Pressure transition assembly 202 includes various operational modes. In a first mode, the pressure within nonmechanical valve 204 and nonmechanical valve 208 is $P_m$. A first plurality of solid particles at the pressure $P_m$ are received by the nonmechanical valve 204 in a manner that prevents the first plurality of the solid particles at the pressure $P_m$ from coming into direct contact with the valve 206.

In a second mode, mechanical valve 206 is in an open position, mechanical valve 210 is in a closed position, the nonmechanical valve gas inlet 216 is in a closed position, and the nonmechanical valve gas outlet 218 is in a closed position. Nonmechanical valve 204 is configured to discharge (e.g., with the use of flow gases) the first plurality of the solid particles at the pressure $P_m$ through the valve 206 and into nonmechanical valve 208, where nonmechanical valve 208 subsequently receives the first plurality of the solid particles at the pressure $P_m$ in a manner that prevents the first plurality of the solid particles at the pressure $P_m$ from directly contacting the mechanical valve 206 or the mechanical valve 208.

In a third mode, the mechanical valve 206 and mechanical valve 210 are in the closed position, and either the nonmechanical valve gas inlet 216 is in the closed position and the nonmechanical valve gas outlet 218 is in the open position, or the nonmechanical valve gas inlet 216 is in the open position and the nonmechanical valve gas outlet 218 is in the closed position. Specifically, if the pressure transition assembly is being used to increase the pressure surrounding the first plurality of solid particles (i.e., if $P_n$ is greater than $P_m$), then the nonmechanical valve gas inlet 216 is in the open position and the nonmechanical valve gas outlet 218 is in the closed position. In contrast, if the pressure transition assembly is being used to decrease the pressure surrounding the first plurality of solid particles (i.e., if $P_m$ is greater than $P_n$), then the nonmechanical valve gas inlet 216 is in the closed position and the nonmechanical valve gas outlet 218 is in the open position. During this third mode, the pressure surrounding the first plurality of solid particles in nonmechanical valve 208 is transitioned from the pressure $P_n$ to the pressure $P_m$.

In a fourth mode, mechanical valve 206 is in a closed position, mechanical valve 210 is in the open position, nonmechanical valve gas inlet 216 is in the closed position, and nonmechanical valve gas outlet 218 is in the closed position. Then, nonmechanical valve 208 is configured to discharge the first plurality of solid particles at the pressure $P_n$ from nonmechanical valve 208 and through valve 210. These particles are either discharged from the pressure transition assembly in a batch as solid particles at pressure $P_n$ 215, or they are received by optional nonmechanical valve 212.

In a fifth mode, mechanical valve 206 and mechanical valve 210 are each in the closed position, and either nonmechanical valve gas inlet 216 is in the open position, and nonmechanical valve gas outlet 218 is in the closed position, or nonmechanical valve gas inlet 216 is in the closed position, and nonmechanical valve gas outlet 218 is in the open position. The configuration of the inlet and outlet in the fifth mode will be opposite from the configuration used in the third mode so as to transition the pressure within the second nonmechanical valve from the pressure $P_n$ back to the pressure $P_m$ so as to prepare the nonmechanical valve 208 to receive the next batch of particles at the pressure $P_m$.

It should be appreciated that, when using a plurality of pressure transition assemblies within a reactor system 100, at least one pressure transition assembly will cause the pressure surrounding the particles moving through the pressure transition assembly to decrease, and at least one other pressure transition assembly will cause the pressure surrounding the particles moving through the pressure transition assembly to increase.

B. Nonmechanical Valves

FIGS. 3-8 are schematic depictions of exemplary nonmechanical valves usable in reactor system 100 and pressure transition assembly system 200. Each nonmechanical valve 300 shown in FIGS. 3-8 includes a solids inlet 304 for receiving solid particles, a retaining portion 306, and solids outlet 308 for discharging solid particles. Solid particles 302 are shown schematically in the nonmechanical valves and arrows 312 show, generally, the flow of solid particles 302 through the nonmechanical valves. Example nonmechanical valves 300 include, but are not limited to, devices such as L-valves, J-valves, Loop seal valves, reversed V-valves, H-valves, or the like where inert gas is provided to aid solids flow.

Each nonmechanical valve also includes one or more inert gas inlets 310 configured to receive inert gas 314 and operable in an open and closed position. Inert gas 314 can be used as a flow gas and/or lubrication gas to aid in solid particles 302 flow through the nonmechanical valves. Example inert gases include $N_2$, $CO_2$, He, and the like (depending on the type of particles flowing through the reactor system).

Each nonmechanical valve is configured such that the valve retains a plurality of particles in the retaining portion in a manner that prevents the particles from directly contacting upstream and/or downstream mechanical valves when those mechanical valves are in the closed position. This configuration is critical for preventing the high temperature solid particles 302 from coming into contact with the mechanical valves, which rapidly deteriorate when exposed to high temperature particles for extended periods of time.

C. Methods

Figure 9:
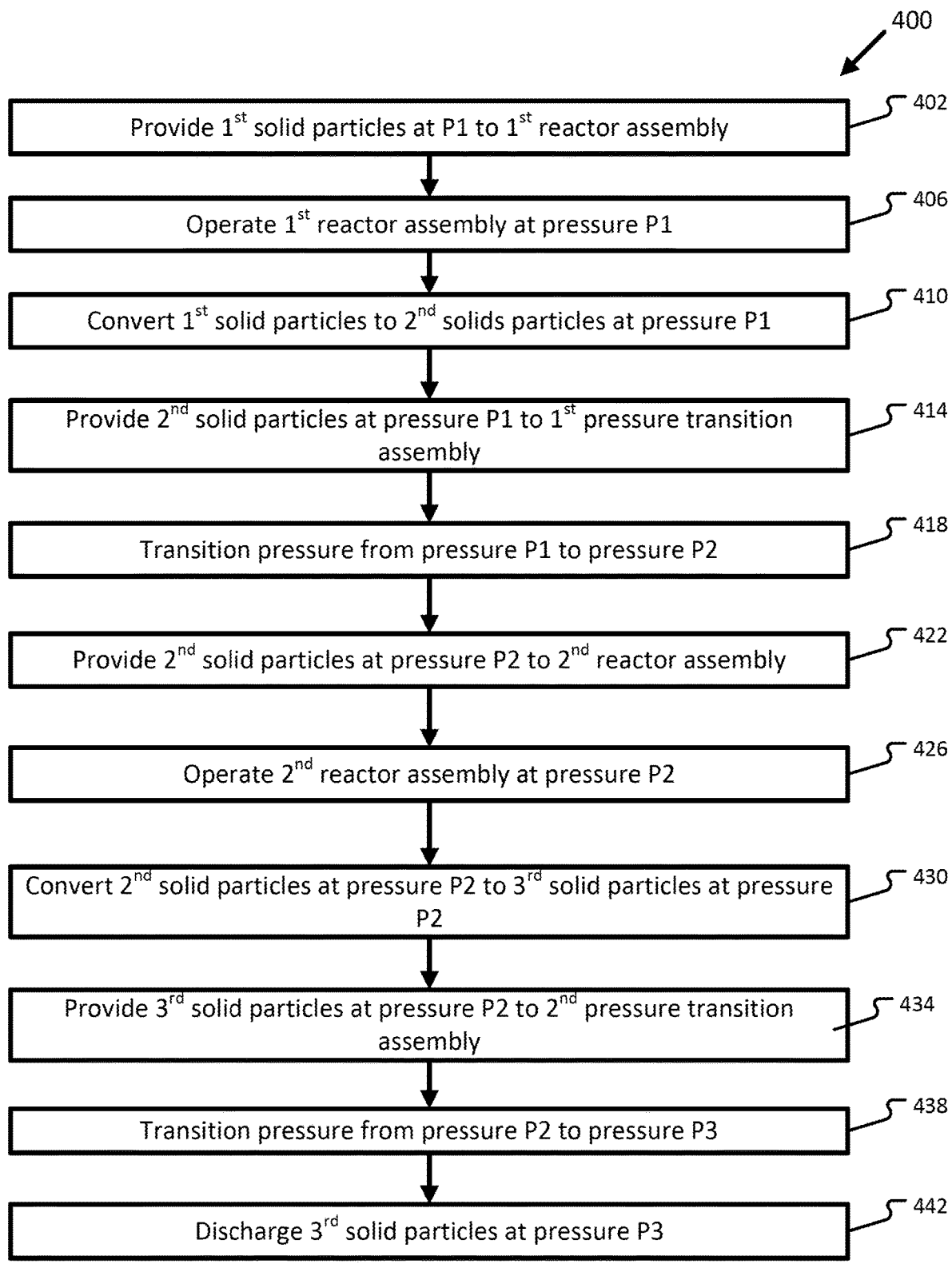
FIG. 9 is a flow chart showing an exemplary method for operating a reactor system according to the present disclosure.

FIG. 9 shows example method 400 for operating a reactor system. Reactor systems described and contemplated herein can be utilized to perform the operations of method 400.

Method 400 begins by providing first solid particles at a pressure P1 to a first reactor assembly (operation 402).

The first reactor assembly is operated at pressure P1 (operation 406). In various embodiments, the first reactor assembly includes one or more first reactor assembly reactors each configured to operate at the pressure P1. In the first reactor assembly, first solid particles at the pressure P1 are converted to second solid particles at the pressure P1 (operation 410).

In some embodiments, a first reactor feedstock is provided to a first reactor in the first reactor assembly. Therein, the first reactor feedstock chemically and/or physically reacts with the first solid particles to form the second solid particles at the pressure P1 and a first reactor product. The first reactor product is discharged from the first reactor.

Then the second solid particles at the pressure P1 are provided to a first pressure transition assembly (operation 414). The first pressure transition assembly transitions the pressure surrounding the second solid particles from the pressure P1 to a pressure P2 (operation 418). Pressure P2 is different from the pressure P1. Next, the second solid particles at the pressure P2 are discharged from the first pressure transition assembly and provided to a second reactor assembly (operation 422).

The second reactor assembly is operated at the pressure P2 (operation 426). In various implementations, the second reactor assembly includes one or more second reactor assembly reactors each configured to operate at the pressure P2. In the second reactor assembly, the second solid particles at the pressure P2 are converted to third solid particles at the pressure P2 (operation 430).

In some embodiments, a second reactor feedstock is provided to a second reactor in the second reactor assembly. Therein, the second reactor feedstock chemically and/or physically reacts with the second solid particles to form the third solid particles at the pressure P2 and, in some instances, a second reactor product. The second reactor product is discharged from the second reactor.

Next, the third solid particles at the pressure P2 are provided to a second pressure transition assembly (operation 434). The second pressure transition assembly transitions the pressure surrounding the third solid particles from the pressure P2 to a pressure P3 (operation 438). Pressure P3 is different from the pressure P2. Then the third solid particles at the pressure P3 are discharged from the second pressure transition assembly (operation 442).

In some embodiments, the pressure P3 is the same as the pressure P1. Then, operation 438 includes transitioning the pressure surrounding the third solid particles from the pressure P2 to the pressure P1. Operation 442 then further includes discharging third solid particles at the pressure P1 and providing those particles to the first reactor assembly.

In some embodiments, the third solid particles at either the pressure P2 or the pressure P3 are provided to a gas-solids separation unit in fluid communication with the second reactor assembly and the first reactor assembly. Then, gas surrounding the third solid particles is discharged from the gas-solids separation unit. Additionally, the third solid particles at either the pressure P2 or the pressure P3 is discharged from the gas-solids separation unit.

In some embodiments, method 400 includes providing the third solid particles at the pressure P3 to a third reactor assembly. In such implementations, method 400 includes operating the third reactor assembly at the pressure P3, where the third reactor assembly includes one or more third reactor assembly reactors each configured to operate at the pressure P3. Feedstock received by a reactor in the third reactor assembly may chemically and/or physically react with solid particles within that reactor to convert the particles to particles having alternative chemical or physical compositions and/or to form a product that may be discharged from the reactor through a reactor product outlet. That is, the third reactor assembly converts the third solid particles at pressure P3 to first solid particles at pressure P3.

In some implementations, a third reactor assembly provides solid particles at the pressure P3 to a third pressure transition assembly. The third pressure transition assembly is in communication with the third reactor assembly and the first reactor assembly. The third pressure transition assembly transitions the pressure surrounding the first solid particles from the pressure P3 to the pressure P1. Then, the third pressure transition assembly discharges the first solid particles at the pressure P1.

1. Example Method for Operating First Pressure Transition Assembly

Figure 10:
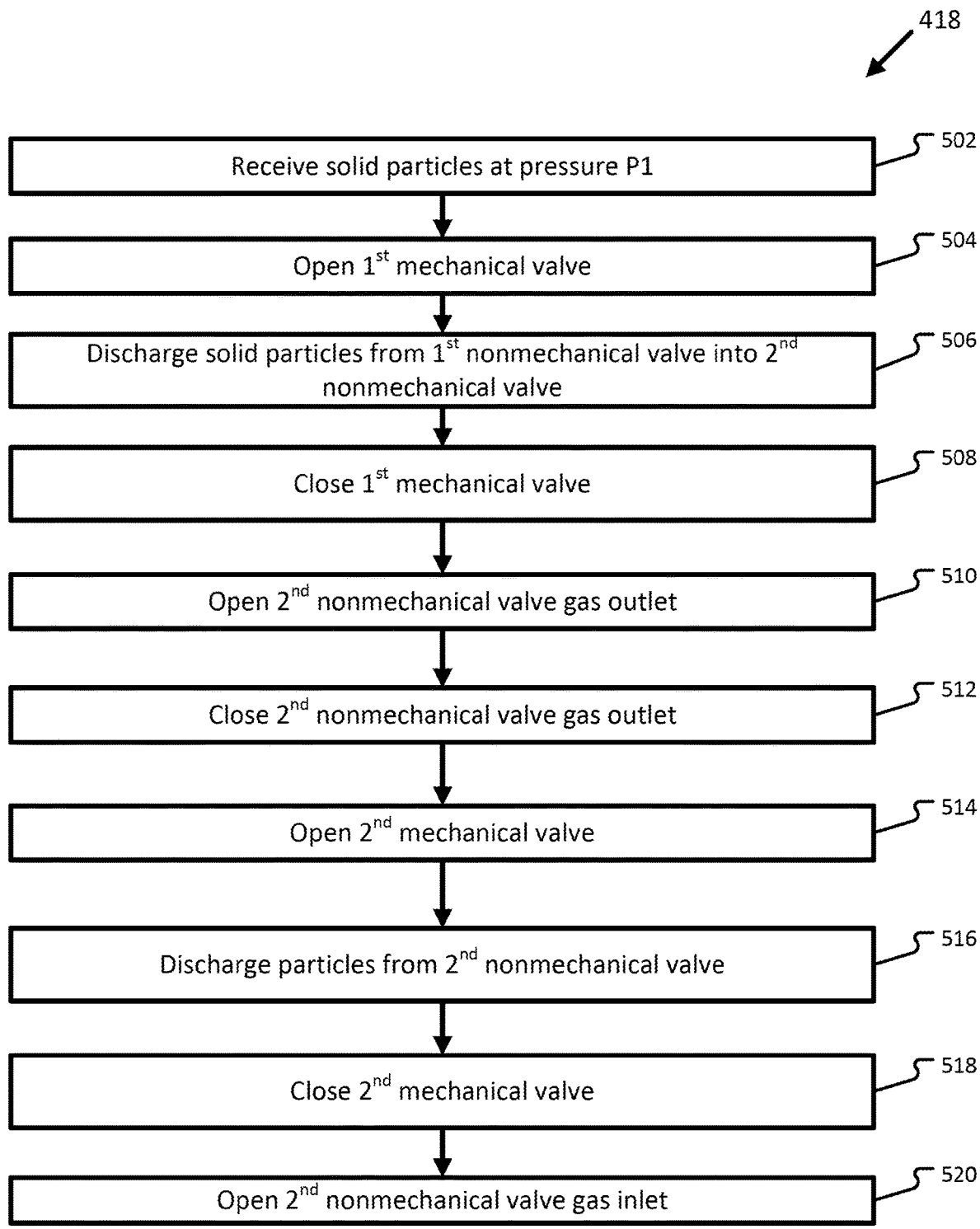
FIG. 10 is a flow chart showing an exemplary method for operating a first pressure transition assembly during the method of FIG. 9.

FIG. 10 shows example method 418 for operating a first pressure transition assembly during example method 400. Pressure transition assemblies described and contemplated herein, with particular reference to FIG. 2 and corresponding discussion above, can be utilized to perform the operations of method 418. The discussion below references various components described above with reference to FIG. 2. Generally, example method 418 includes operations for transitioning a pressure surrounding solid particles in a pressure transition assembly. Typically, example method 418 is used to lower pressure surrounding solid particles from a pressure P1 to a pressure P2.

Method 418 begins by receiving second solid particles at pressure P1 (operation 502). During operation 502, the first mechanical valve is in the closed position and the pressure within the first nonmechanical valve is P1. Receiving solid particles at pressure P1 (operation 502) is performed in a manner that prevents the solid particles at the pressure P1 from coming into direct contact with the first mechanical valve when the first mechanical valve is in the closed position.

Next, the first mechanical valve is opened (operation 504). Opening the first mechanical valve occurs when the pressure within the first nonmechanical valve is P1, the second mechanical valve is in the closed position, the second nonmechanical valve gas inlet is in the closed position and the second nonmechanical valve gas outlet is in the closed position.

Then solid particles are discharged from the first nonmechanical valve and into the second nonmechanical valve (operation 506). The solids particles pass through the first mechanical valve in a manner that prevents the solid particles at the pressure P1 from directly contacting the first or second mechanical valves. Next, the first mechanical valve is closed (operation 508). The second mechanical valve is also closed, as noted above.

Pressure is transitioned by opening the second nonmechanical valve gas outlet (operation 510). Operation 510 can also include monitoring a pressure within the second nonmechanical valve. When the pressure P2 is reached, the second nonmechanical valve gas outlet is closed (operation 512). Then the second mechanical valve is opened (operation 514) and the solid particles at pressure P2 are discharged from the second nonmechanical valve (operation 516).

After the solid particles at pressure P2 pass through the second mechanical valve (operation 516), the second mechanical valve is closed (operation 518). Then the pressure within the second nonmechanical valve is transitioned from the pressure P2 to the pressure P1 by opening the nonmechanical valve gas inlet (operation 520).

2. Example Method for Operating Second Pressure Transition Assembly

Figure 11:
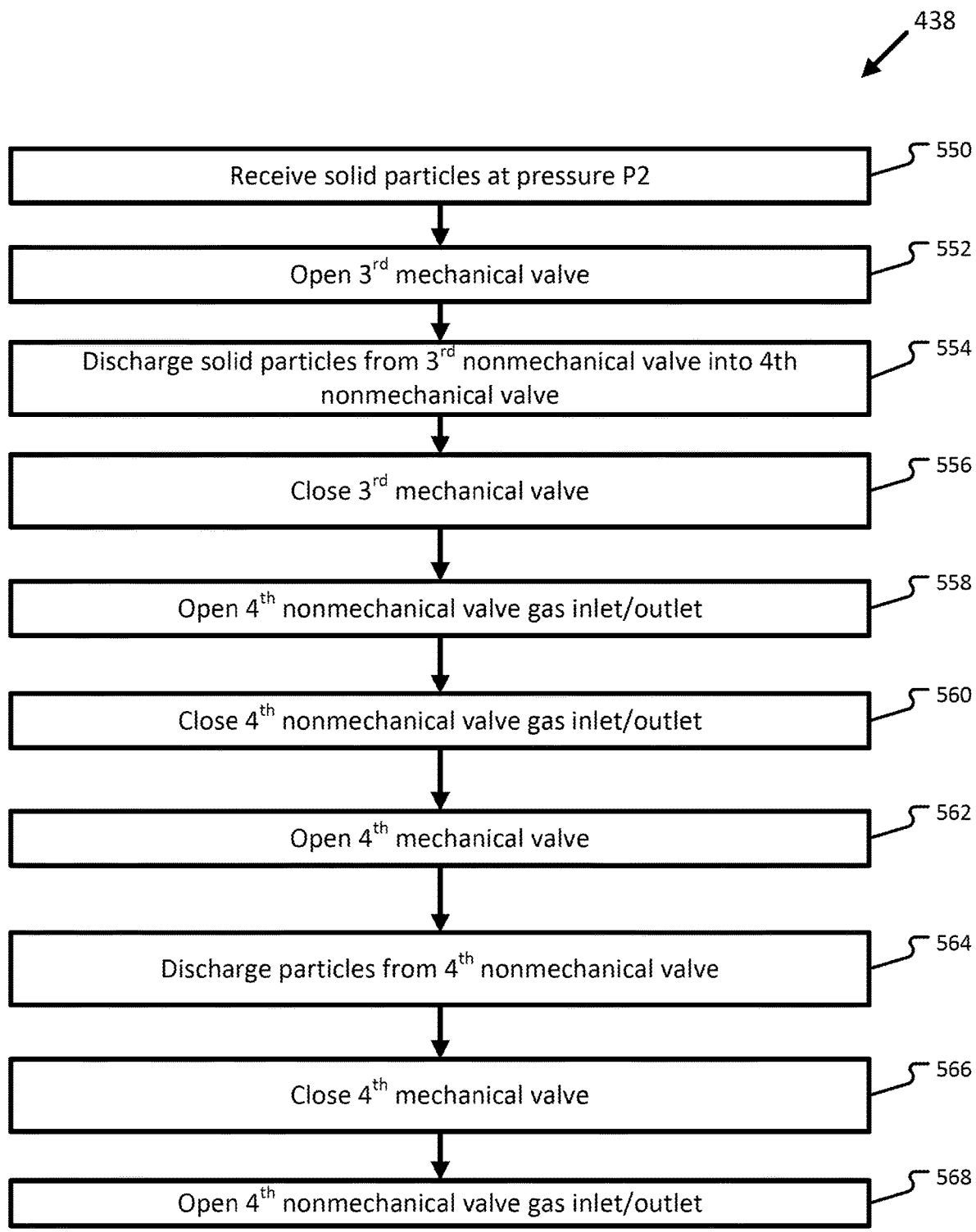
FIG. 11 is a flow chart showing an exemplary method for operating a second pressure transition assembly during the method of FIG. 9.

FIG. 11 shows example method 438 for operating a second pressure transition assembly during example method 400. Pressure transition assemblies described and contemplated herein, with particular reference to FIG. 2 and corresponding discussion above, can be utilized to perform the operations of method 438. The discussion below references various components described above with reference to FIG. 2. Generally, example method 438 includes operations for transitioning a pressure surrounding solid particles in a pressure transition assembly. Example method 438 can be used to raise or lower a pressure surrounding solid particles from a pressure P2 to a pressure P3.

Method 438 begins by receiving second solid particles at pressure P2 (operation 550). During operation 550, the third mechanical valve is in the closed position and the pressure within the third nonmechanical valve is P2. Receiving third solid particles at pressure P2 (operation 550) is performed in a manner that prevents the third solid particles at the pressure P2 from coming into direct contact with the third mechanical valve when the third mechanical valve is in the closed position.

Next, the third mechanical valve is opened (operation 552). Opening the third mechanical valve occurs when the pressure within the third nonmechanical valve is P2, the fourth mechanical valve is in the closed position, the fourth nonmechanical valve gas inlet is in the closed position and the fourth nonmechanical valve gas outlet is in the closed position.

Then solid particles are discharged from the third nonmechanical valve and into the fourth nonmechanical valve (operation 554). The solids particles pass through the third mechanical valve in a manner that prevents the third solid particles at the pressure P2 from directly contacting the third or fourth mechanical valves. Next, the third mechanical valve is closed (operation 556). The fourth mechanical valve is also closed, as noted above.

Pressure is transitioned by opening the fourth nonmechanical valve gas outlet or inlet (operation 558). That is, to increase the pressure in the fourth nonmechanical valve, the fourth nonmechanical valve gas inlet is opened. Conversely, to decrease the pressure in the fourth nonmechanical valve, the fourth nonmechanical valve gas outlet is opened. Operation 558 can also include monitoring a pressure within the fourth nonmechanical valve.

When a pressure P3 is reached, depending upon the desired pressure change, either the second nonmechanical valve gas inlet or outlet is closed (operation 560). Then the fourth mechanical valve is opened (operation 562) and the solid particles at pressure P3 are discharged from the fourth nonmechanical valve (operation 564).

After the solid particles at pressure P3 pass through the fourth mechanical valve (operation 564), the fourth mechanical valve is closed (operation 566). Then the pressure within the fourth nonmechanical valve is transitioned from the pressure P3 to the pressure P2 by opening either the nonmechanical valve gas inlet or outlet (operation 568), depending upon which was opened and closed during operations 558 and 560.

II. Exemplary Configurations and Applications

The systems and methods described above can be applied to a variety of reactor system types, solid particle types, and operating conditions. For instance, systems and methods disclosed herein find application in chemical looping reactor systems, in product purification systems, and in reactive adsorption systems. Example configurations and applications of the systems and methods described above are provided below.

A. Reactor Flow Schemes

The reactor assemblies described in this disclosure can be configured to operate in a variety of flow schemes, depending upon the implementation. Example flow schemes for the solid particles and gaseous components in one or more reactor assemblies in the reactor system include: countercurrent or co-current moving bed, fluidized bed in any fluidization regimes, countercurrent or co-current fixed bed, and any combination of these reactors.

B. Chemical Looping Reactor Systems

Systems and methods disclosed and contemplated herein can be implemented as chemical looping reactor systems. Chemical looping reactor systems typically include systems that perform reduction-oxidation and/or reaction-regeneration using catalytic or non-catalytic metal derivative materials such as metal-oxides, metal-carbides, metal-nitrides, metal-borides and metal-silicides.[1-2] In the context of the systems and methods described above, the first reactor assembly, the second reactor assembly, and the third reactor assembly can include one or more of: reducer reactors, oxidizer reactors, and combustion reactors.

Chemical looping reactor systems have a wide range of energy applications including power generation, chemical synthesis, liquid fuel production, $CO_2$ utilization and solar energy conversion.[1-4] Chemical looping reactor systems utilize two reactor types to perform these reaction functions: the reducer/reactor and the combustor/regenerator. The separation of the reducer/reactor and the combustor/regenerator allows for increasingly pure product gas generation.

The function of each of these reactors can be demonstrated using metal-oxides as example catalytic metal derivatives in a chemical looping system and methane as an example energy source. In this example, a chemical looping reducer reactor oxidizes methane to produce either partial ($CO+H_2$) or full ($CO_2+H_2O$) combustion products, depending on the metal-oxide and the desired downstream product. The methane oxidation occurs utilizing the oxygen from the metal-oxide, which is reduced to a lower oxidation state. The oxygen-depleted metal-oxide is regenerated in the combustor reactor using air as the oxygen source.

In certain chemical looping applications, a third reactor, the oxidizer reactor, is included between the reducer and the combustor reactor. The oxidizer partially oxidizes the reduced metal-oxide from the reducer reactor using steam and/or $CO_2$ to produce $H_2$ and/or CO. This partially oxidized metal-oxide is re-oxidized using air in the combustor reactor. Several examples of chemical looping systems with four or five different reactor functions exist and as such, this disclosure applies to a chemical looping system containing 'n' distinct reactors and reactor functions.[5]

C. Product Purification and Reactive Adsorption Systems

Systems and methods disclosed and contemplated herein can be implemented as product purification systems and as reactive adsorption systems. Product purification includes processes such as nitrogen production from air, $CO_2$ removal from hydrogen prior to use in ammonia production, removal of $H_2S$ from hydrogen in hydrotreating and hydrocracking units and $CO_2$ removal from biogas to increase methane content. The technology used in these processes is also known as the Pressure Swing Adsorption technology (PSA) and generally employs two or more reactors operated under different pressures for continuous operation.

In a two reactor system, one reactor is operated at a higher pressure to enhance the adsorption of the desired gas whereas the other reactor is operated at a lower pressure to regenerate the adsorbent and recover the adsorbed gas. Depending on the process scheme selected there can be intermediate steps of delivery, purge and backfill in a pressure swing adsorption cycle.

Reactive adsorption processes, also known as sorption enhanced recovery process (SERP), conducts reactions along with product separation in a single reactor. The reactor contains a mixture of catalyst and adsorbent material which are homogeneously mixed. The reactants are injected at a high pressure into the reactor where they are converted to products by the catalyst. The adsorbent adsorbs the products generated and shifts the reaction equilibrium towards forming more products which increases the reactant conversion and also the product purity. The adsorbed products are then desorbed from the adsorbent at a lower pressure in the regenerator. The reactor and the regenerator can be operated in a fixed bed, moving bed or fluidized bed reactor configuration. The following are some example implementations.

In one embodiment, the above described systems can be used for pure nitrogen production. The system is operated with a plurality of particles comprising adsorbents like zeolite 5A, zeolite 13X and Carbon molecular sieves with a particle diameter ranging from 2 mm to 5 mm. In a system with two reactors, one of the reactors is operated under elevated pressure (e.g., 8 bara) for the adsorption of oxygen by adsorbent particles and thus pure nitrogen is obtained at the reactor outlet. The other reactor is operated at a lower pressure (e.g., 1 bara) for the desorption of oxygen from adsorbent particles. Both the reactors are operated at temperature ranges between 35-40° C.

In yet another embodiment, the above described systems can be used for $CO_x$ removal from hydrogen. Hydrogen produced from steam methane reforming contains impurities of CO and $CO_2$ ($CO_x$) which need to be removed before the hydrogen being used for downstream processes. The system is operated with a plurality of particles comprising adsorbents like zeolite 5A, activated carbon and zeolite 13X. In a system with two reactors, one of the reactors is operated under elevated pressure (e.g., 7 bara) for the adsorption of $CO_x$ impurities by adsorbent particles and thus hydrogen stream with a purity of 99.999% is obtained at the reactor outlet. The other reactor is operated at a lower pressure (e.g., 0.1 bara) for the desorption of $CO_x$ from adsorbent particles. Both the reactors are operated at temperature ranges between 30-35° C.

In yet another embodiment, the above described system can be used for $H_2S$ removal from process gases. $H_2S$ is removed from process gases and/or vent gases in oil refineries, coal gasification units and geothermal plants. The system is operated with a plurality of particles comprising adsorbents like silicalite and alumina. In a system with two reactors, one of the reactors is operated under elevated pressure (e.g., 1.05-1.5 bara) for the adsorption of H2s from process gases by adsorbent particles. The other reactor is operated at a lower pressure (e.g., 0.05-0.3 bara) for the desorption of $H_2S$ from adsorbent particles. Both the reactors are operated at temperature ranges between 10-50° C.

In yet another embodiment, the above described system can be used for Biogas upgrading. Biogas contains about 30-40% $CO_2$. The $CO_2$ is removed from biogas using the system operated with a plurality of particles comprising adsorbents like molecular sieves, activated carbons, zeolites and titanosilicates. In the system, one of the reactors is operated under elevated pressure (e.g., 4-10 bara) for the adsorption of $CO_2$ by adsorbent particles. The other reactor is operated at a lower pressure (e.g., 0.1-0.3 bara) for the desorption of $CO_2$ from adsorbent particles. Both the reactors are operated at temperature ranges between 25-50° C.

In yet another embodiment, the above described system can be used for reverse water gas shift reaction for the production of CO from $CO_2$ and $H_2$. The system is operated with a plurality of particles comprising a low-temperature shift catalyst and NaX zeolite adsorbent. In the system, one reactor is operated under elevated pressure (e.g. 4.8 bara) and temperature of about 250° C. for the generation of CO with a purity of >99% from CO2 and H2 is an equilibrium controlled reaction which can be carried out at 480 kPa and 250° C. in presence of a low-temperature shift catalyst and NaX zeolite adsorbent. The other reactor is operated at a lower pressure, (e.g. 1.15-1.29 bara) for the regeneration of particles.

In yet another embodiment, the above described system can be used for butadiene production from 1-butene through dehydrogenation reactions. The system is operated with a plurality of particles comprising a $CrO_2$-alumina catalyst mixed with zeolite K-Y adsorbent. In the system, one reactor is operated under elevated pressure (e.g., 1.2-2.5 bara) and temperature (e.g., 250-500° C.) for the generation of 1,3-butadience which is subsequently adsorbed in by the zeolite adsorbent. The adsorbed 1,3-butadiene is then desorbed from the adsorbent particles in the other reactor operated at a lower pressure (e.g., 1 bara), and the pure stream of 1,3-butadiene is produced. The system can also be used to produce benzene from cyclohexane and/or toluene from methyl-cyclohexane.

In yet another embodiment, the above described system can be used for isomerization of n-paraffins to isoparaffins for upgrading naphtha. The system is operated with a plurality of particles comprising a Pd/H-faujasite catalyst and zeolite adsorbent. In the system, one reactor is operated under elevated pressure (e.g., 14-20 bara) and temperature (e.g., 200-400° C.) for the generation of iso-pentane by partially converting n-pentane and the unconverted n-pentane is adsorbed in the zeolite adsorbent bed. The adsorbed n-pentane is then desorbed from the adsorbent particles in the other reactor operated at a lower pressure (e.g., 1 bara).

In yet another embodiment, the above described system can be used for hydrogen production from steam methane reforming. The system is operated with a plurality of particles comprising a Ni-based catalyst and hydrotalcite-based $CO_2$ adsorbent. In the system, one reactor is operated under elevated pressure (e.g., 5 bara) and temperature (e.g., 450° C.) for the generation of hydrogen. The $CO_2$ generated during the reactor is adsorbed by the sorbent. The adsorbed $CO_2$ is then desorbed from the adsorbent particles in the other reactor operated at a lower pressure (e.g., 1 bara) and at the same time, the particles are regenerated.

D. Compressor Usage

As discussed above, various prior implementations of reactor systems utilized reactors operating at different pressures. Typically, one or more compressor units were needed to compress reactor input streams and/or reactor outlet or product streams.

For instance, an example co-current chemical looping system operates a reducer reactor and a combustor reactor at comparable pressure. Such a chemical looping system operating at comparable pressures requires the use of compressors and expanders when the desired downstream product is at higher pressures. In a chemical looping combustion application, the coal-direct chemical looping system for generating electricity from coal operates at atmospheric pressure but requires a compressor to pressurize the $CO_2$ produced to 150 atm for sequestration. The energy penalty for this coal-direct chemical looping system with 90% $CO_2$ capture is 10% as compared to a baseline pulverized coal plant without $CO_2$ capture. Around half of this energy penalty (~5%) comes from $CO_2$ compression, the capital cost of which is ~80% of the reducer reactor. A higher pressure operation of a coal direct chemical looping (CDCL) system following the chemical looping system necessitates the use of an air compressor to compress air for regeneration (i.e., reoxidation) of the redox active catalytic particles. In both cases (higher pressure and atmospheric pressure), the requirement for the CDCL system to have a $CO_2$ supply at 150 atm for sequestration results in an energy penalty due to compression and a comparable capital cost investment in compression.

In a chemical looping gasification application, the methane to syngas (MTS) chemical looping system, when integrated into a gas to liquids plant, is required to provide syngas at 30 atm for the Fischer-Tropsch reactors. An economic analysis of this MTS syngas generation technology in a 50,000 bbl/day gas to liquids plant shows that 40% to 70% of the capital cost comes from the compression demands. Generally, in reactor systems that require the product at pressures higher than atmospheric pressure, the compression costs play a significant role in determining the overall economics and energy efficiency.

In contrast, the instantly disclosed systems and methods enable operating reactor assemblies at different pressures without the use of compressors for reactor input streams and/or reactor outlet or product streams.

E. Valve Cooling

In various implementations, piping around valves and the valve body itself can be forcibly cooled. The heat exchange strategies and the cooling methods can include, but are not limited to, gas cooling, liquid cooling, a combination of them, or the like. In an example implementation, cooling ports are added to the pipes before and after the valve to allow cooling gas flow through the pipe. Thus, the working environment of the valve is kept cool. In another configuration, a heat exchanger is installed along a pipe section before and after the valve and heat is removed through the coolant flowing through the heat exchanger.

F. Valve Purging

In some instances, debris of the solids particles may severely damage the mechanical valve, shortening the service time of the valve and increasing the maintenance and operation cost of the system. An inert gas inlet can be added upstream of the valve to remove the debris from the valve area before closing the valve.

During an example operation, when a nonmechanical valve positioned upstream is shut off, inert gas is directed through the pipe at the valve area to move debris near the valve. To avoid any disturbance of the inert gas to the system, a drainage pipe can be added to the pipe immediately after the valve, serving as the outlet of the inert gas.

G. Operating Conditions

In some embodiments, one reactor in the system or method (e.g., the first reactor of a two-reactor system or method or the first and second reactors of a three-reactor system or method) operates at a pressure of about 2 atm to about 150 atm, or about 5 atm to about 150 atm, or about 10 atm to about 150 atm, e.g., about 2 atm, about 3 atm, about 4 atm, about 5 atm, about 6 atm, about 7 atm, about 8 atm, about 9 atm, about 10 atm, about 15 atm, about 20 atm, about 25 atm, about 30 atm, about 35 atm, about 40 atm, about 45 atm, about 50 atm, about 55 atm, about 60 atm, about 65 atm, about 70 atm, about 75 atm, about 80 atm, about 85 atm, about 90 atm, about 95 atm, about 100 atm, about 105 atm, about 110 atm, about 115 atm, about 120 atm, about 125 atm, about 130 atm, about 135 atm, about 140 atm, about 145 atm, or about 150 atm.

In some embodiments, another reactor in the system or method (e.g., the second reactor of a two-reactor system or method or the third reactor of a three-reactor system or method) operates at a pressure between ambient pressure and less than pressure of the higher-pressure reactor(s) of the system. For example, this reactor can operate at ambient pressure. In other embodiments, this reactor can operate at a pressure that about 1 atm less, about 2 atm less, about 3 atm less, about 4 atm less, about 5 atm less, about 6 atm less, about 7 atm less, about 8 atm less, about 9 atm less, about 10 atm less, about 15 atm less, about 20 atm less, about 25 atm less, about 30 atm less, about 35 atm less, about 40 atm less, about 45 atm less, about 50 atm less, about 55 atm less, about 60 atm less, about 65 atm less, about 70 atm less, about 75 atm less, about 80 atm less, about 85 atm less, about 90 atm less, about 95 atm less, about 100 atm less, about 105 atm less, about 110 atm less, about 115 atm less, about 120 atm less, about 125 atm less, about 130 atm less, about 135 atm less, about 140 atm less, or about 145 atm less, compared to the higher-pressure reactor(s) of the system or method.

H. Particles

The terms "particles," "solids particles," and "metal oxide particles" may be used interchangeably herein.

The systems and methods described herein use a plurality of particles to chemically or physically react with feedstock.

For example, the particles may comprise a metal oxide to oxidize fuel, where the metal is selected from Fe, Co, Ni, Cu, Mo, Mn, Sn, Ru, and Rh, or any combination thereof. In some embodiments, the metal oxide comprises $Fe_2O_3$ or a composite metal oxide such as $FeO·TiO_2$ or $FeO·Al_2O_3$. During the methods and in the systems described herein, the metal oxide cycles through multiple oxidation states. In some embodiments, the metal oxide may cycle through oxidation states including a reduced metal (e.g., Fe), a reduced metal oxide (e.g., FeO), and an intermediate oxidation state metal oxide (e.g., $Fe_3O_4$). As another example, the particles may be adsorbents made with very porous materials for their large specific surface areas. Typical adsorbents include but are not limited to activated carbon, silica gel, alumina, resin and zeolite.

The particles may include one or more support materials. The one or more support materials can be selected from metals, metal oxides, metal carbides, metal nitrates, and metal halides, wherein the metal is selected from Li, Be, B, Na, Mg, Al, Si, K, Ca, Sc, Ti, V, Cr, Mn, Co, Zn, Ga, Ge, Rb, Sr, Y, Zr, Nb, Mo, Cd, In, Sn, Sb, Cs, Ba, La, Ce, and Th. In some embodiments, the one or more support materials are selected from alumina, ceria, niobia, silica, tantalum oxide, tin oxide, and titania, or any combination thereof.

In some embodiments, the plurality of particles may further comprise a dopant, such as a dopant selected from Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt, and Au, or any combination thereof. In some embodiments, the dopant may be selected from Co, Ni, and Cu. The particles that may be used in the systems and methods described herein include particles described in International Patent Publication Nos. WO 2010/037011, WO 2012/155059, and WO 2014/160223, and in U.S. Provisional Patent Application Nos. 62/519,376 (filed Jun. 27, 2017) and 62/546,886 (filed Aug. 17, 2017).

III. Reactor System Efficiency

A baseline US Department of Energy report shows that the capital cost investment for a 50,000 barrel per day (bpd) gas to liquids plant is $86,000/bpd. Goellner, J. F., V. Shah, M. J. Turner, N. J. Kuehn, J. Littlefield, G. Cooney, and J. Marriott, "Analysis of Natural Gas-to Liquid Transportation Fuels via Fischer-Tropsch," United States Department of Energy/NETL, DOE/NETL-2013/1597, Pittsburgh, Pa. (2013). A chemical looping syngas generation without the use of this invention was sized to yield a capital cost of the GTL plant of ~$80,000/bpd. Kathe, M., D. Xu, T.-L. Hsieh, J. Simpson, R. Statnick, A. Tong, and L.-S. Fan, "Chemical Looping Gasification for Hydrogen Enhanced Syngas Production with in-situ CO2 Capture," United States Department of Energy, OSTI: 1185194, (2015). This invention allows for the capital cost investment in the chemical looping system to be as low as $65,000/bpd (a reduction of ~25% total plant cost over the conventional system).

REFERENCES

1. Fan, L.-S., L. Zeng, and S. Luo, "Chemical-Looping Technology Platform," AIChE Journal, 61(1), 2-22 (2015).
2. Fan, L.-S., "Chemical Looping Systems for Fossil Energy Conversions," John Wiley & Sons, Hoboken, N.J. (2010).
3. Adanez, J., A. Abad, F. Garcia-Labiano, P. Gayan, and L. F. de Diego, "Progress in Chemical-Looping Combustion and Reforming Technologies," Progress in Energy and Combustion Science, 38, 215-282 (2012).
4. Ishida, M., D. Zheng, and T. Akehata, "Evaluation of a Chemical-Looping-Combustion Power-Generation System by Graphic Exergy Analysis," Energy, 12(2), 147-154 (1987).
5. Fan, Liang-Shih, Mandar Kathe, William Wang, Elena Chung, and Andrew Tong. "Systems and methods for partial or complete oxidation of fuels." U.S. Patent Publication 2015/0238915.
6. Connell, D. P., L. Zeng, L.-S. Fan, D. A. Lewandowski, and R. M. Statnick, "Process Simulation of Iron-Based Chemical Looping Schemes with $CO_2$ Capture for Hydrogen and Electricity Production from Coal," Presented at 29th Annual International Pittsburgh Coal Conference, Pittsburgh, Pa., Oct. 15-18 (2012).
7. Miller, D. C., J. T. Litynski, L. A. Brickett, B. D. Morreale, "Toward Transformational Carbon Capture," AIChE Journal, 62, 1-10 (2016).
8. Luo, S., L. Zeng, D. Xu, M. Kathe, E. Chung, N. Deshpande, L. Qin, A. Majumder, T.-L. Hsieh, A. Tong, Z. Sun, and L.-S. Fan, "Shale Gas-to-Syngas Chemical Looping Process for Stable Shale Gas Conversion to High Purity Syngas with $H_2$:CO Ratio of 2:1," Energy and Environmental Science, 7(12), 4104-4117, (2014).
9. Kathe, M., D. Xu, T.-L. Hsieh, J. Simpson, R. Statnick, A. Tong, and L.-S. Fan, "Chemical Looping Gasification for Hydrogen Enhanced Syngas Production with in-situ $CO_2$ Capture," United States Department of Energy, OSTI: 1185194, (2015).

EMBODIMENTS

Embodiments of the present disclosure are disclosed in the following clauses:

Clause 1. A reactor system, comprising:

a first reactor assembly, which comprises one or more first reactor assembly reactors, each configured to operate at a pressure P1, wherein the first reactor assembly is configured to receive first solid particles at a pressure P1, convert the first solid particles at the pressure P1 to second solid particles at the pressure P1, and discharge the second solid particles at the pressure P1;

a first pressure transition assembly in fluid communication with the first reactor assembly and a second reactor assembly, wherein the first pressure transition assembly is configured to receive the second solid particles at the pressure P1, transition the pressure surrounding the second solid particles from the pressure P1 to a pressure P2 that is different from the pressure P1, and discharge the second solid particles at the pressure P2;

the second reactor assembly, which comprises one or more second reactor assembly reactors, each configured to operate at the pressure P2, wherein the second reactor assembly is configured to receive the second solid particles at the pressure P2, convert the second solid particles at the pressure P2 to third solid particles at the pressure P2, and discharge the third solid particles at the pressure P2;

a second pressure transition assembly in fluid communication with the second reactor assembly and the first reactor assembly, the second pressure transition assembly configured to receive third solid particles at the pressure P2, transition the pressure surrounding the third solid particles from the pressure P2 to a pressure P3 that is different from the pressure P2, and discharge the third solid particles at the pressure P3 from the second pressure transition assembly.

Clause 2. The reactor system of clause 1, wherein the first reactor assembly comprises a first reactor that includes:

a first reactor inlet configured to receive a first reactor feedstock that chemically, physically, or chemically and physically reacts with solid particles within the first reactor to form the second solid particles at the pressure P1; and a first reactor solids outlet configured to discharge the second solid particles at the pressure P1.

Clause 3. The reactor system of clause 2, wherein the first reactor feedstock chemically, physically, or chemically and physically reacts with solid particles within the first reactor to further form a first reactor product, and wherein the first reactor further comprises a first reactor product outlet configured to discharge the first reactor product at the pressure P1.

Clause 4. The reactor system of any of clauses 1-3, wherein the second reactor assembly comprises a second reactor that includes a second reactor solids outlet configured to discharge the third solid particles at the pressure P2.

Clause 5. The reactor system of clause 4, wherein the second reactor further includes a second reactor inlet configured to receive a second reactor feedstock that chemically, physically, or chemically and physically reacts with solid particles within the second reactor to form the third solid particles at the pressure P2.

Clause 6. The reactor system of either cause 4 or clause 5, wherein the second reactor further includes a second reactor outlet configured to discharge a second reactor product at the pressure P2.

Clause 7. The reactor system of any of clauses 1-6, wherein the pressure P3 is the same as the pressure P1, such that the second pressure transition assembly is configured to transition the pressure surrounding the third solid particles from the pressure P2 to the pressure P1 and discharge the third solid particles at the pressure P1 from the second pressure transition assembly, and wherein the third solid particles at the pressure P1 are the first solid particles at the pressure P1 received by the first reactor assembly.

Clause 8. The reactor of any of clauses 1-7, wherein the first solid particles are metal oxide particles, the second solid particles are reduced metal oxide particles, and the third solid particles are oxidized metal oxide particles.

Clause 9. The reactor system of any of clauses 1-8, wherein P2 is less than P1.

Clause 10. The reactor system of any of clauses 1-9, further comprising a gas-solids separation unit between and in fluid communication with the second reactor assembly and the first reactor assembly, the gas-solids separation unit including a separation unit solids inlet configured to receive the third solid particles at either the pressure P2 or the pressure P3, a separation unit gas outlet configured to discharge gas surrounding the third particles from the gas-solids separation unit, and a separation unit solids outlet configured to discharge the third particles at either the pressure P2 or the pressure P3, respectively, from the gas-solids separation unit.

Clause 11. The reactor system of any of clauses 1-10, further comprising:

a third reactor assembly, which comprises one or more third reactor assembly reactors, each configured to operate at the pressure P3, wherein the third reactor assembly is configured to receive the third solid particles at the pressure P3, convert the third solid particles at the pressure P3 to the first solid particles at the pressure P3, and discharge the first solid particles at the pressure P3; and a third pressure transition assembly in fluid communication with the third reactor assembly and the first reactor assembly, the third pressure transition assembly configured to receive the first solid particles at the pressure P3, transition the pressure surrounding the first solid particles from the pressure P3 to the pressure P1, and discharge the first solid particles at the pressure P1 from the third transition assembly.

Clause 12. The reactor system of any of clauses 1-11, wherein the first pressure transition assembly includes:

a first nonmechanical valve, a first mechanical valve, a second nonmechanical valve and a second mechanical valve, wherein the first nonmechanical valve is positioned between and in fluid communication with the first reactor assembly and the first mechanical valve, the first mechanical valve is operable in an open and a closed position, the second nonmechanical valve is positioned between and in fluid communication with the first nonmechanical valve and the first mechanical valve, and the second mechanical valve is operable in an open and closed position, and wherein the second nonmechanical valve further includes a second nonmechanical valve gas inlet for receiving pressurized inert gas that is operable in an open and closed position, and a second nonmechanical valve gas outlet for releasing pressurized gas that is operable in an open and closed position.

Clause 13. The reactor system of clause 12, wherein the first pressure transition assembly further comprises at least one additional nonmechanical valve in fluid communication with and positioned between:

the first reactor assembly and the first nonmechanical valve;

the first nonmechanical valve and the first mechanical valve;

the first mechanical valve and the second nonmechanical valve;

the second nonmechanical valve and the second mechanical valve; and the second mechanical valve and the second reactor assembly.

Clause 14. The reactor system of either clause 12 or clause 13, wherein the first pressure transition assembly operates in:

a first mode wherein the pressure within the first and second nonmechanical valves is P1, the first mechanical valve is in a closed position, and a first plurality of the second solid particles at the pressure P1 are received by the first nonmechanical valve in a manner that prevents the first plurality of the second solid particles at the pressure P1 from coming into direct contact with the first mechanical valve;

a second mode wherein the first mechanical valve is in an open position, the second mechanical valve is in a closed position, the second nonmechanical valve gas inlet is in a closed position, and the second nonmechanical valve gas outlet is in a closed position, wherein the first nonmechanical valve is configured to discharge the first plurality of the second solid particles at the pressure P1 through the first mechanical valve and into the second nonmechanical valve, wherein subsequently the second nonmechanical valve receives the first plurality of the second solid particles at the pressure P1 in a manner that prevents the first plurality of the second solid particles at the pressure P1 from directly contacting the first or second mechanical valves;

a third mode wherein the first and second mechanical valves are in the closed position, the second nonmechanical valve gas inlet is in the closed position, and the second nonmechanical valve gas outlet is in the open position, whereupon the pressure surrounding the first plurality of the second solid particles in the second nonmechanical valve is transitioned from the pressure P1 to the pressure P2;

a fourth mode, wherein the first mechanical valve is in the closed position, the second mechanical valve is in the open position, and the second nonmechanical valve gas inlet and second nonmechanical valve gas outlet are each in the closed position, whereupon the second nonmechanical valve is configured to discharge the first plurality of the second solid particles at the pressure P2 from the second nonmechanical valve and through the second mechanical valve; and a fifth mode, wherein the first and second mechanical valves are each in the closed position, the second nonmechanical valve gas inlet is in the open position, and the second nonmechanical valve gas outlet is in the closed position, whereupon the pressure within the second nonmechanical valve transitions from the pressure P2 to the pressure P1.

Clause 15. The reactor system of any of clauses 1-14, wherein the second pressure transition assembly includes:

a third nonmechanical valve, a third mechanical valve, a fourth nonmechanical valve and a fourth mechanical valve, wherein the third nonmechanical valve is positioned between and in fluid communication with the second reactor assembly and the third mechanical valve, the third mechanical valve is operable in an open and a closed position, the fourth nonmechanical valve is positioned between and in fluid communication with the third mechanical valve and the fourth mechanical valve, and the fourth mechanical valve is operable in an open and closed position, and wherein the fourth nonmechanical valve further includes a fourth nonmechanical valve gas inlet for receiving pressurized inert gas that is operable in an open and closed position, and a fourth nonmechanical valve gas outlet for releasing pressurized gas that is operable in an open and closed position.

Clause 16. The reactor system of clause 15, wherein the second pressure transition assembly further comprises at least one additional nonmechanical valve in fluid communication with and positioned between:

the second reactor assembly and the third nonmechanical valve;

the third nonmechanical valve and the third mechanical valve;

the third mechanical valve and the fourth nonmechanical valve; and the fourth nonmechanical valve and the fourth mechanical valve.

Clause 17. The reactor system of clause 16, wherein the second pressure transition assembly operates in:

a first mode wherein the pressure within the third and fourth nonmechanical valves is P2, the third mechanical valve is in a closed position, and a first plurality of the third solid particles at the pressure P2 are received by the third nonmechanical valve in a manner that prevents the first plurality of the third solid particles at the pressure P2 from coming into direct contact with the third mechanical valve;

a second mode wherein the third mechanical valve is in an open position, the fourth mechanical valve is in a closed position, the fourth nonmechanical valve gas inlet is in a closed position, and the fourth nonmechanical valve gas outlet is in a closed position, wherein the third nonmechanical valve is configured to discharge the first plurality of the third solid particles at the pressure P2 through the third mechanical valve and into the fourth nonmechanical valve, wherein subsequently the fourth nonmechanical valve receives the first plurality of the third solid particles at the pressure P2 in a manner that prevents the first plurality of the third solid particles at the pressure P2 from coming into direct contact with the third or fourth mechanical valves;

a third mode wherein the third and fourth mechanical valves are in the closed position, and either the fourth nonmechanical valve gas outlet or the fourth nonmechanical valve gas inlet is in the open position, whereupon the pressure surrounding the first plurality of third solid particles in the fourth nonmechanical valve is transitioned from the pressure P2 to the pressure P3;

a fourth mode, wherein the third mechanical valve is in the closed position, the fourth mechanical valve is in the open position, and the fourth nonmechanical valve gas inlet and fourth nonmechanical valve gas outlet are each in the closed position, whereupon the fourth nonmechanical valve is configured to discharge the first plurality of the third solid particles at the pressure P3 from the fourth nonmechanical valve and through the fourth mechanical valve; and a fifth mode, wherein the third and fourth mechanical valves are each in the closed position, and either the fourth nonmechanical valve gas inlet or the fourth nonmechanical valve gas outlet is in the open position, whereupon the pressure within the second nonmechanical valve transitions from the pressure P3 to the pressure P2.

Clause 18. The reactor system of any of clauses 1-17, wherein each of the first and second pressure transition assemblies comprise one or more flow gas inlets, each configured to provide a flow gas to move particles within the transition assemblies through various portions of the transition assemblies.

Clause 19. The reactor system of any of clauses 1-18, wherein the reactor system does not include a compressor unit to compress reactant gases entering the reactor system or product gases leaving the reactor system.

Clause 20. A method for operating a reactor system, the method comprising:

providing first solid particles at a pressure P1 to a first reactor assembly;

operating the first reactor assembly at the pressure P1, the first reactor assembly including one or more first reactor assembly reactors each configured to operate at the pressure P1;

in the first reactor assembly, converting the first solid particles at the pressure P1 to second solid particles at the pressure P1;

providing the second solid particles at the pressure P1 to a first pressure transition assembly;

in the first pressure transition assembly, transitioning the pressure surrounding the second solid particles from the pressure P1 to a pressure P2 that is different from the pressure P1;

discharging the third second particles at the pressure P2 from the first pressure transition assembly, and providing the second solid particles at the pressure P2 to a second reactor assembly;

operating the second reactor assembly at the pressure P2, the second reactor assembly including one or more second reactor assembly reactors each configured to operate at the pressure P2;

in the second reactor assembly, converting the second solid particles at the pressure P2 to third solid particles at the pressure P2;

providing the third solid particles at the pressure P2 to a second pressure transition assembly;

in the second pressure transition assembly, transitioning the pressure surrounding the third solid particles from the pressure P2 to a pressure P3 that is different from pressure P2; and discharging the third solid particles at the pressure P3 from the second pressure transition assembly.

Clause 21. The method of clause 20, further comprising:

providing a first reactor feedstock to a first reactor in the first reactor assembly, the first reactor feedstock chemically and/or physically reacting with solid particles within the first reactor to form the second solid particles at the pressure P1, wherein the first reactor feedstock chemically, physically, or chemically and physically reacts with solid particles within the first reactor to further form a first reactor product; and discharging the first reactor product at the pressure P1 from the first reactor.

Clause 22. The method of either clause 20 or clause 21, further comprising providing a second reactor feedstock to a second reactor in the second reactor assembly, the second reactor feedstock chemically and/or physically reacting with solid particles within the second reactor to form the third solid particles at the pressure P2.

Clause 23. The method of any of clauses 20-22, further comprising discharging a second reactor product at the pressure P2 from the second reactor.

Clause 24. The method of any of clauses 20-23, wherein the pressure P3 is the same as the pressure P1, such that the step of transitioning the pressure surrounding the third solid particles from the pressure P2 to a pressure P3 comprises transitioning the pressure surrounding the third solid particles from the pressure P2 to the pressure P1, and wherein the step of discharging the third solid particles at the pressure P3 from the second pressure transition assembly comprises discharging the third solid particles at the pressure P1 from the second pressure transition assembly, and wherein the third solid particles at the pressure P1 are the first solid particles at the pressure P1 provided to the first reactor assembly.

Clause 25. The method of any of clauses 20-24, further comprising:

providing the third solid particles at either the pressure P2 or the pressure P3 to a gas-solids separation unit in fluid communication with the second reactor assembly and the first reactor assembly;

discharging gas surrounding the third solid particles from the gas-solids separation unit; and discharging the third solid particles at either the pressure P2 or the pressure P3 from the gas-solids separation unit.

Clause 26. The method of any of clauses 20-25, further comprising providing the third solid particles at the pressure P3 to a third reactor assembly;

operating the third reactor assembly at the pressure P3, the third reactor assembly including one or more third reactor assembly reactors each configured to operate at the pressure P3;

in the third reactor assembly, converting the third solid particles at the pressure P3 to the first solid particles at the pressure P3;

providing the first solid particles at the pressure P3 to a third pressure transition assembly;

in the third pressure transition assembly, transitioning the pressure surrounding the first solid particles from the pressure P3 to the pressure P1; and discharging the first solid particles at the pressure P1 from the third pressure transition assembly.

Clause 27. The method of any of clauses 20-26, wherein the first pressure transition assembly includes:

a first nonmechanical valve, a first mechanical valve, a second nonmechanical valve and a second mechanical valve, wherein the first nonmechanical valve is positioned between and in fluid communication with the first reactor assembly and the first mechanical valve, the first mechanical valve is operable in an open and a closed position, the second nonmechanical valve is positioned between and in fluid communication with the first mechanical valve and the second mechanical valve, and the second mechanical valve is operable in an open and closed position, and wherein the second nonmechanical valve further includes a second nonmechanical valve gas inlet for receiving pressurized inert gas that is operable in an open and closed position, and a second nonmechanical valve gas outlet for releasing pressurized gas that is operable in an open and closed position, the method further comprising the following steps in sequential order:

receiving at the first nonmechanical valve a first plurality of the second solid particles at the pressure P1 when the first mechanical valve is in the closed position and the pressure within the first nonmechanical valve is P1, wherein the first plurality of the second solid particles at the pressure P1 is received in a manner that prevents the first plurality of the second solid particles at the pressure P1 from coming into direct contact with the first mechanical valve when the first mechanical valve is in the closed position;

opening the first mechanical valve when the pressure within the first nonmechanical valve is P1, the pressure within the second nonmechanical valve is P1, the second mechanical valve is in the closed position, the second nonmechanical valve gas inlet is in the closed position and the second nonmechanical valve gas outlet is in the closed position;

discharging the first plurality of the second solid particles at the pressure P1 from the first nonmechanical valve, through the first mechanical valve, and into the second nonmechanical valve, whereupon the second nonmechanical valve subsequently receives the first plurality of the second solid particles at the pressure P1 in a manner that prevents the first plurality of the second solid particles at the pressure P1 from directly contacting the first or second mechanical valves;

closing the first mechanical valve;

opening the second nonmechanical valve gas outlet and transitioning the pressure surrounding the first plurality of the second solid particles in the second nonmechanical valve from the pressure P1 to the pressure P2;

closing the second nonmechanical valve gas outlet;

opening the second mechanical valve;

discharging the first plurality of the second solid particles at the pressure P2 from the second nonmechanical valve and through the second mechanical valve;

closing the second mechanical valve;

opening the second nonmechanical valve gas inlet and transitioning the pressure within the second nonmechanical valve from the pressure P2 to the pressure P1.

Clause 28. The method of any of clauses 20-27, wherein the second pressure transition assembly includes a third nonmechanical valve, a third mechanical valve, a fourth nonmechanical valve and a fourth mechanical valve, wherein the third nonmechanical valve is positioned between and in fluid communication with the second reactor assembly and the third mechanical valve, the third mechanical valve is operable in an open and a closed position, the fourth nonmechanical valve is positioned between and in fluid communication with the third mechanical valve and the fourth mechanical valve, and the fourth mechanical valve is operable in an open and closed position, and wherein the fourth nonmechanical valve further includes a fourth nonmechanical valve gas inlet for receiving pressurized inert gas that is operable in an open and closed position, and a fourth nonmechanical valve gas outlet for releasing pressurized gas that is operable in an open and closed position, the method further comprising the following steps in sequential order:

receiving at the third nonmechanical valve a first plurality of the third solid particles at the pressure P2 when the third mechanical valve is in the closed position and the pressure within the third nonmechanical valve is P2, wherein the first plurality of the third solid particles at the pressure P2 is received in a manner that prevents the first plurality of the third solid particles at the pressure P2 from coming into direct contact with the third mechanical valve when the third mechanical valve is in the closed position;

opening the third mechanical valve when the pressure within the third nonmechanical valve is P2, the pressure within the fourth nonmechanical valve is P2, the fourth mechanical valve is in the closed position, the fourth nonmechanical valve gas inlet is in the closed position and the fourth nonmechanical valve gas outlet is in the closed position;

discharging the first plurality of the third solid particles at the pressure P2 from the third nonmechanical valve, through the third mechanical valve, and into the fourth nonmechanical valve, whereupon the fourth nonmechanical valve subsequently receives the first plurality of the third solid particles at the pressure P2 in a manner that prevents the first plurality of the second solid particles at the pressure P2 from directly contacting the third or fourth mechanical valves;

closing the third mechanical valve;

opening either the fourth nonmechanical valve gas inlet or the fourth nonmechanical valve gas outlet, and transitioning the pressure surrounding the first plurality of the third solid particles in the fourth nonmechanical valve from the pressure P2 to the pressure P3;

closing either the fourth nonmechanical valve gas inlet or the fourth nonmechanical valve gas outlet;

opening the fourth mechanical valve;

discharging the first plurality of the third solid particles at the pressure P3 from the fourth nonmechanical valve and through the fourth mechanical valve;

closing the fourth mechanical valve;

opening either the fourth nonmechanical valve gas inlet or the fourth nonmechanical valve gas outlet, and transitioning the pressure within the fourth nonmechanical valve from the pressure P3 to the pressure P2.

Clause 29. The method of any of clauses 20-28, wherein the pressure P2 is less than the pressure P1.

Clause 30. The method of any of clauses 20-29, wherein the reactor system does not include a compressor unit to compress reactant gases entering the reactor system or product gases leaving the reactor system.

It is understood that the foregoing detailed description and accompanying examples are merely illustrative and are not to be taken as limitations upon the scope of the disclosure.

Various changes and modifications to the disclosed embodiments will be apparent to those skilled in the art. Such changes and modifications, including without limitation those relating to the chemical structures, substituents, derivatives, intermediates, syntheses, compositions, formulations, or methods of use, may be made without departing from the spirit and scope of the disclosure.

What is claimed is:

1. A reactor system, comprising:
    a first reactor including a plurality of solid particles and configured to operate at a pressure P1, wherein the first reactor is configured to convert the solid particles at the pressure P1 to second solid particles at the pressure P1, and discharge the second solid particles at the pressure P1 through a first reactor solids outlet;
    a first pressure transition assembly in fluid communication with the first reactor solids outlet and a second reactor, the first pressure transition assembly comprising:
        a first nonmechanical valve, a first mechanical valve, a second nonmechanical valve and a second mechanical valve,
            the first nonmechanical valve being positioned between and in fluid communication with the first reactor and the first mechanical valve, the second nonmechanical valve being positioned between and in fluid communication with the first mechanical valve and the second mechanical valve, and
            the first nonmechanical valve including a plurality of inert gas inlets, each of the plurality of inert gas inlets being in fluid communication with an inert gas source; and each of the plurality of inert gas inlets being configured to provide a flow gas to move particles through the first nonmechanical valve;
            the second nonmechanical valve including a plurality of inert gas inlets, each of the plurality of inert gas inlets being in fluid communication with an inert gas source, each of the plurality of inert gas inlets being configured to provide a flow gas to move particles through the first nonmechanical valve;
            the second nonmechanical valve further includes a second nonmechanical valve gas inlet in fluid communication with a pressurized inert gas source, and a second nonmechanical valve gas outlet for releasing pressurized gas;
        wherein the first pressure transition assembly is configured to receive the second solid particles at the pressure P1, transition the pressure surrounding the second solid particles from the pressure P1 to a pressure P2 that is different from the pressure P1, and discharge the second solid particles at the pressure P2;
    the second reactor configured to operate at the pressure P2, wherein the second reactor is configured to receive the second solid particles at the pressure P2 from the first pressure transition assembly, convert the second solid particles at the pressure P2 to third solid particles at the pressure P2, and discharge the third solid particles at the pressure P2 through a second reactor solids outlet; and
    a second pressure transition assembly in fluid communication with the second reactor and the first reactor, the second pressure transition assembly configured to receive third solid particles at the pressure P2, transition the pressure surrounding the third solid particles from the pressure P2 to a pressure P3 that is different from the pressure P2, and discharge the third solid particles at the pressure P3 from the second pressure transition assembly.

2. The reactor system of claim 1, wherein the first reactor further comprises:
    a first reactor inlet configured to receive a first reactor feedstock that chemically, physically, or chemically and physically reacts with solid particles within the first reactor to form the second solid particles at the pressure P1.

3. The reactor system of claim 2, wherein the first reactor feedstock chemically, physically, or chemically and physically reacts with solid particles within the first reactor to further form a first reactor product, and wherein the first reactor further comprises a first reactor product outlet configured to discharge the first reactor product at the pressure P1.

4. The reactor system of claim 1, wherein each of the first and second pressure transition assemblies comprise one or more flow gas inlets, each configured to provide a flow gas to move particles within the transition assemblies through various portions of the transition assemblies.

5. The reactor system of claim 1, wherein the second reactor further includes a second reactor inlet configured to receive a second reactor feedstock that chemically, physically, or chemically and physically reacts with solid particles within the second reactor to form the third solid particles at the pressure P2.

6. The reactor system of claim 1, wherein the second reactor further includes a second reactor outlet configured to discharge a second reactor product at the pressure P2.

7. The reactor system of claim 1, wherein the pressure P3 is the same as the pressure P1, such that the second pressure transition assembly is configured to transition the pressure surrounding the third solid particles from the pressure P2 to the pressure P1 and discharge the third solid particles at the pressure P1 from the second pressure transition assembly, and wherein the third solid particles at the pressure P1 are the first solid particles at the pressure P1 received by the first reactor.

8. The reactor of claim 1, wherein the first solid particles are metal oxide particles, the second solid particles are reduced metal oxide particles, and the third solid particles are oxidized metal oxide particles.

9. The reactor system according to claim 1, wherein P2 is less than P1.

10. The reactor system of claim 1, further comprising a gas-solids separation unit between and in fluid communication with the second reactor and the first reactor, the gas-solids separation unit including a separation unit solids inlet configured to receive the third solid particles at either the pressure P2 or the pressure P3, a separation unit gas outlet configured to discharge gas surrounding the third particles from the gas-solids separation unit, and a separation unit solids outlet configured to discharge the third particles at either the pressure P2 or the pressure P3, respectively, from the gas-solids separation unit.

11. The reactor system of claim 1, further comprising:
a third reactor configured to operate at the pressure P3, wherein the third reactor is configured to receive the third solid particles at the pressure P3, convert the third solid particles at the pressure P3 to the first solid particles at the pressure P3, and discharge the first solid particles at the pressure P3; and
a third pressure transition assembly in fluid communication with the third reactor and the first reactor, the third pressure transition assembly configured to receive the first solid particles at the pressure P3, transition the pressure surrounding the first solid particles from the pressure P3 to the pressure P1, and discharge the first solid particles at the pressure P1 from the third transition assembly.

12. The reactor system of claim 1, wherein the reactor system does not include a compressor unit to compress reactant gases entering the reactor system or product gases leaving the reactor system.

13. The reactor system of claim 1, wherein the first pressure transition assembly further comprises at least one additional nonmechanical valve in fluid communication with and positioned between:
the first reactor and the first nonmechanical valve;
the first nonmechanical valve and the first mechanical valve;
the first mechanical valve and the second nonmechanical valve;
the second nonmechanical valve and the second mechanical valve; and
the second mechanical valve and the second reactor.

14. The reactor system of claim 1, wherein the first pressure transition assembly operates in:
a first mode wherein the pressure within the first and second nonmechanical valves is P1, the first mechanical valve is in a closed position, and a first plurality of the second solid particles at the pressure P1 are received by the first nonmechanical valve in a manner that prevents the first plurality of the second solid particles at the pressure P1 from coming into direct contact with the first mechanical valve;
a second mode wherein the first mechanical valve is in an open position, the second mechanical valve is in a closed position, the second nonmechanical valve gas inlet is in a closed position, and the second nonmechanical valve gas outlet is in a closed position, wherein the first nonmechanical valve is configured to discharge the first plurality of the second solid particles at the pressure P1 through the first mechanical valve and into the second nonmechanical valve, wherein subsequently the second nonmechanical valve receives the first plurality of the second solid particles at the pressure P1 in a manner that prevents the first plurality of the second solid particles at the pressure P1 from directly contacting the first or second mechanical valves;
a third mode wherein the first and second mechanical valves are in the closed position, the second nonmechanical valve gas inlet is in the closed position, and the second nonmechanical valve gas outlet is in the open position, whereupon the pressure surrounding the first plurality of the second solid particles in the second nonmechanical valve is transitioned from the pressure P1 to the pressure P2;
a fourth mode, wherein the first mechanical valve is in the closed position, the second mechanical valve is in the open position, and the second nonmechanical valve gas inlet and second nonmechanical valve gas outlet are each in the closed position, whereupon the second nonmechanical valve is configured to discharge the first plurality of the second solid particles at the pressure P2 from the second nonmechanical valve and through the second mechanical valve; and
a fifth mode, wherein the first and second mechanical valves are each in the closed position, the second nonmechanical valve gas inlet is in the open position, and the second nonmechanical valve gas outlet is in the closed position, whereupon the pressure within the second nonmechanical valve transitions from the pressure P2 to the pressure P1.

15. The reactor system of claim 1, wherein the second pressure transition assembly includes:
a third nonmechanical valve, a third mechanical valve, a fourth nonmechanical valve and a fourth mechanical valve, wherein the third nonmechanical valve is positioned between and in fluid communication with the second reactor and the third mechanical valve, the third mechanical valve is operable in an open and a closed position, the fourth nonmechanical valve is positioned between and in fluid communication with the third mechanical valve and the fourth mechanical valve, and the fourth mechanical valve is operable in an open and closed position, and wherein the fourth nonmechanical valve further includes a fourth nonmechanical valve gas inlet for receiving pressurized inert gas that is operable in an open and closed position, and a fourth nonmechanical valve gas outlet for releasing pressurized gas that is operable in an open and closed position.

16. The reactor system of claim 15, wherein the second pressure transition assembly further comprises a fifth nonmechanical valve in fluid communication with and positioned between:
   the second reactor and the third nonmechanical valve;
   the third nonmechanical valve and the third mechanical valve;
   the third mechanical valve and the fourth nonmechanical valve; and
   the fourth nonmechanical valve and the fourth mechanical valve.

17. The reactor system of claim 16, wherein the second pressure transition assembly operates in:
   a first mode wherein the pressure within the third and fourth nonmechanical valves is P2, the third mechanical valve is in a closed position, and a first plurality of the third solid particles at the pressure P2 are received by the third nonmechanical valve in a manner that prevents the first plurality of the third solid particles at the pressure P2 from coming into direct contact with the third mechanical valve;
   a second mode wherein the third mechanical valve is in an open position, the fourth mechanical valve is in a closed position, the fourth nonmechanical valve gas inlet is in a closed position, and the fourth nonmechanical valve gas outlet is in a closed position, wherein the third nonmechanical valve is configured to discharge the first plurality of the third solid particles at the pressure P2 through the third mechanical valve and into the fourth nonmechanical valve, wherein subsequently the fourth nonmechanical valve receives the first plurality of the third solid particles at the pressure P2 in a manner that prevents the first plurality of the third solid particles at the pressure P2 from coming into direct contact with the third or fourth mechanical valves;
   a third mode wherein the third and fourth mechanical valves are in the closed position, and either the fourth nonmechanical valve gas outlet or the fourth nonmechanical valve gas inlet is in the open position, whereupon the pressure surrounding the first plurality of third solid particles in the fourth nonmechanical valve is transitioned from the pressure P2 to the pressure P3;
   a fourth mode, wherein the third mechanical valve is in the closed position, the fourth mechanical valve is in the open position, and the fourth nonmechanical valve gas inlet and fourth nonmechanical valve gas outlet are each in the closed position, whereupon the fourth nonmechanical valve is configured to discharge the first plurality of the third solid particles at the pressure P3 from the fourth nonmechanical valve and through the fourth mechanical valve; and
   a fifth mode, wherein the third and fourth mechanical valves are each in the closed position, and either the fourth nonmechanical valve gas inlet or the fourth nonmechanical valve gas outlet is in the open position, whereupon the pressure within the second nonmechanical valve transitions from the pressure P3 to the pressure P2.

* * * * *